(12) United States Patent
Kono et al.

(10) Patent No.: US 9,322,686 B2
(45) Date of Patent: Apr. 26, 2016

(54) FLOW SENSOR

(71) Applicant: Hitachi Automotive Systems, Ltd., Hitachinaka-shi, Ibaraki (JP)

(72) Inventors: Tsutomu Kono, Tokyo (JP); Keiji Hanzawa, Hitachinaka (JP); Noboru Tokuyasu, Hitachinaka (JP); Shinobu Tashiro, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/390,893

(22) PCT Filed: Apr. 4, 2013

(86) PCT No.: PCT/JP2013/060266
§ 371 (c)(1),
(2) Date: Oct. 6, 2014

(87) PCT Pub. No.: WO2013/151112
PCT Pub. Date: Oct. 10, 2013

(65) Prior Publication Data
US 2015/0122050 A1 May 7, 2015

(30) Foreign Application Priority Data
Apr. 6, 2012 (JP) ................................. 2012-087561

(51) Int. Cl.
*G01F 1/68* (2006.01)
*G01F 1/58* (2006.01)
(Continued)

(52) U.S. Cl.
CPC ................ *G01F 1/58* (2013.01); *G01F 1/6842* (2013.01); *G01F 1/6845* (2013.01); *G01F 1/692* (2013.01)

(58) Field of Classification Search
CPC ............. G01F 1/38; G01F 1/68; H01L 27/14; H01L 23/12; G01L 9/00
USPC ............. 73/861.47, 204.26, 204.23; 257/419, 257/414, 704
See application file for complete search history.

(56) References Cited

U.S. PATENT DOCUMENTS 5,207,102 A * 5/1993 Takahashi ........... G01L 19/0084
29/621.1
5,880,366 A 3/1999 Yamaguchi
(Continued)

FOREIGN PATENT DOCUMENTS

JP 8-285652 A 11/1996
JP 11-6752 A 1/1999
(Continued)

OTHER PUBLICATIONS

International Search Report (PCT/ISA/210) dated Jul. 9, 2013 with English translation (four pages).
(Continued)

*Primary Examiner* — Jewel V Thompson
(74) *Attorney, Agent, or Firm* — Crowell & Moring LLP

(57) ABSTRACT

Technology capable of suppressing performance variation for each flow sensor and enhancing the performance is provided. According to a flow sensor of an embodiment, a local cavity CAV is provided on an upper surface SUR (MR) of a resin MR to generate an eddying current in a counterclockwise direction, so that an advancing direction of gas (air) that collided to an exposed side surface of a semiconductor chip CHP1 can be changed to an eddying direction instead of a direction toward an upper side of the semiconductor chip CHP1 differing by 90 degrees. Therefore, according to the flow sensor of the embodiment, the flow of the gas (air) at an upper side of the flow sensing unit FDU can be stably made smooth without being disturbed, whereby a flow sensing accuracy in the flow sensing unit FDU can be enhanced.

10 Claims, 17 Drawing Sheets

(51) Int. Cl.
*G01F 1/692* (2006.01)
*G01F 1/684* (2006.01)

(56) References Cited

U.S. PATENT DOCUMENTS

| | | | |
|---|---|---|---|
| 6,393,907 B1 | 5/2002 | Yamakawa et al. | |
| 7,560,811 B2* | 7/2009 | Sakakibara | B81B 7/007 257/414 |
| 2006/0086188 A1* | 4/2006 | Avramescu | G01L 9/0025 73/700 |
| 2007/0210392 A1* | 9/2007 | Sakakibara | B81B 7/007 257/414 |
| 2009/0096041 A1* | 4/2009 | Sakakibara | B81B 7/007 257/419 |
| 2009/0230487 A1* | 9/2009 | Saitoh | B81B 7/0061 257/419 |
| 2011/0140211 A1 | 6/2011 | Kono et al. | |

FOREIGN PATENT DOCUMENTS

| | | |
|---|---|---|
| JP | 2003-90750 A | 3/2003 |
| JP | 2004-74713 A | 3/2004 |
| JP | 2008-175780 A | 7/2008 |
| JP | 2009-58230 A | 3/2009 |
| JP | 2010-112804 A | 5/2010 |
| JP | 2010-151542 A | 7/2010 |
| JP | 2010-281809 A | 12/2010 |
| JP | 2011-122984 A | 6/2011 |

OTHER PUBLICATIONS

Japanese-language Written Opinion (PCT/ISA/237) dated Jul. 9, 2013 (three pages).
Extended European Search Report issued in counterpart European Application No. 13771884.7 dated Dec. 7, 2015 (Six (6) pages).

* cited by examiner

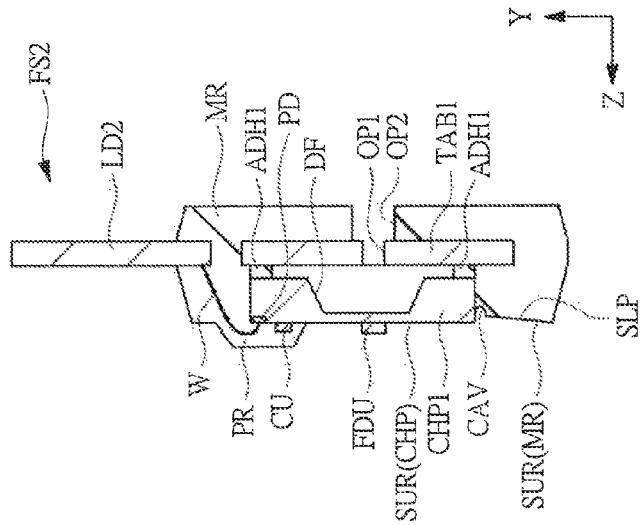
FIG. 23C
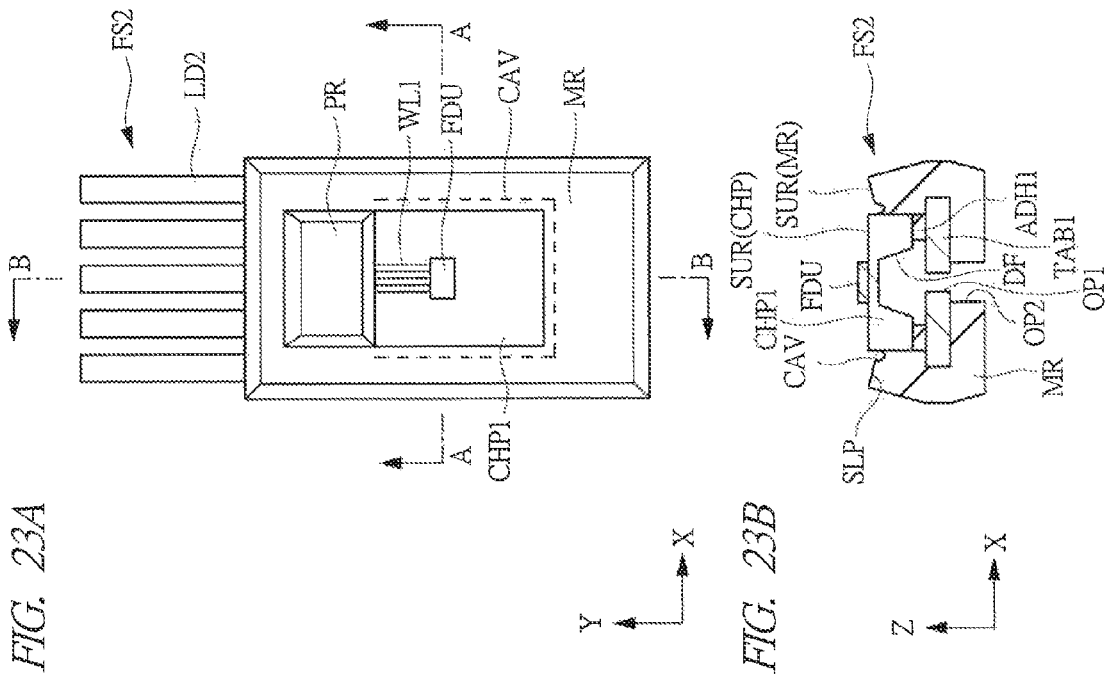
FIG. 23A
FIG. 23B

FLOW SENSOR

TECHNICAL FIELD

The present invention relates to a flow sensor, and in particular, to a technology that is effective when applied to a structure of a flow sensor.

BACKGROUND

Japanese Patent Application Laid-Open Publication No. 2008-175780 (Patent Document 1) describes a structure in which a first semiconductor chip formed with a flow sensing unit of a flow sensor, and a second semiconductor chip formed with a control circuit section that controls the flow sensing unit are mounted on a supporting member. The first semiconductor chip and the second semiconductor chip are connected with a wire, and the second semiconductor chip and the wire are covered with resin. In the first semiconductor chip formed with the flow sensing unit, a front surface is exposed, and side surfaces of the first semiconductor chip are covered with resin. In this case, a height of the resin formed to cover the side surfaces of the first semiconductor chip and the exposed front surface of the first semiconductor chip are flush.

Japanese Patent Application Laid-Open Publication No. 2004-74713 (Patent Document 2) discloses a technology of clamping a component with a mold installed with a separation film sheet and flowing resin therein, as a method for manufacturing a semiconductor package.

Japanese Patent Application Laid-Open Publication No. 2011-122984 (Patent Document 3) describes a technology of manufacturing a flow sensor using an insert piece supported with a spring in a mold or an elastic body film as a flow sensor in which a flow sensing unit for a gas (air) flow is exposed.

Patent Document 1: Japanese Patent Application Laid-Open Publication No. 2008-175780
Patent Document 2: Japanese Patent Application Laid-Open Publication No. 2004-74713
Patent Document 3: Japanese Patent Application Laid-Open Publication No. 2011-122984

SUMMARY

Problems to be Solved by the Invention

For example, an electronic control fuel injection device is currently arranged in an internal combustion engine of an automobile, and the like. The electronic control fuel injection device has a role of efficiently operating the internal combustion engine by appropriately adjusting the amount of gas (air) and fuel flowing into the internal combustion engine. Thus, the gas (air) that flows into the internal combustion engine needs to be accurately perceived in the electronic control fuel injection device. Therefore, the electronic control fuel injection device includes a flow sensor (air flow sensor) for measuring the flow of the gas (air).

Among the flow sensors, a flow sensor manufactured by a semiconductor micro-machining technology, in particular, has been given attention as the cost can be reduced and the flow sensor can be driven at low power. Such a flow sensor, for example, has a configuration in which a diaphragm (thin plate section) formed by anisotropic etching is formed on a rear surface of a semiconductor substrate made of silicon, and a flow sensing unit including a heating resistor and a resistance thermometer is formed on a front surface of the semiconductor substrate opposing the diaphragm.

In addition to the first semiconductor chip formed with the diaphragm and the flow sensing unit, the actual flow sensor also includes, for example, a second semiconductor chip formed with a control circuit section for controlling the flow sensing unit. The first semiconductor chip and the second semiconductor chip are, for example, mounted on a substrate, and electrically connected to wirings (terminals) formed on the substrate. Specifically, for example, the first semiconductor chip is connected to a wiring formed on the substrate by a wire including a gold wire, and the second semiconductor chip is connected to a wiring formed on the substrate using a bump electrode formed on the second semiconductor chip. The first semiconductor chip and the second semiconductor chip mounted on the substrate are thereby electrically connected by way of the wirings formed on the substrate. As a result, the flow sensing unit formed on the first semiconductor chip can be controlled with the control circuit section formed on the second semiconductor chip, whereby the flow sensor is configured.

In this case, the gold wire (wire) connecting the first semiconductor chip and the substrate is normally fixed with a potting resin to prevent contact, and the like due to deformation. That is, the gold wire (wire) is covered and fixed by the potting resin, and the gold wire (wire) is protected by the potting resin. The first semiconductor chip and the second semiconductor chip configuring the flow sensor are normally not sealed with the potting resin. In other words, only the gold wire (wire) is covered with the potting resin in the normal flow sensor.

The fixation of the gold wire (wire) by the potting resin is not carried out with the first semiconductor chip fixed with the mold, and the like, and hence the first semiconductor chip may shift from the mounting position due to the contraction of the potting resin. Furthermore, the dimensional accuracy of the potting resin is low since the potting resin is formed by being dropped. As a result, the mounting position of the first semiconductor chip formed with the flow sensing unit may shift and the forming position of the potting resin may subtly differ for each individual flow sensor, whereby the sensing performance of each flow sensor may vary. Thus, the sensing performance needs to be corrected for each flow sensor to suppress the variation in the performance of each flow sensor, and a need to add a performance correcting step in the manufacturing step of the flow sensor arises. In particular, when the performance correcting step becomes long, the throughput in the manufacturing step of the flow sensor lowers and the cost of the flow sensor increases. Furthermore, since hardening of the potting resin is not promoted by heating, the time until the potting resin hardens becomes long and the throughput in the manufacturing step of the flow sensor lowers.

It is an object of the present invention to provide a technology capable of suppressing the performance variation for each flow sensor and enhancing the performance (also includes a case of enhancing the reliability and enhancing the performance).

The above and other preferred aims and novel characteristics of the present invention will be apparent from the description of the present specification and the accompanying drawings.

Means for Solving the Problems

The typical ones of the inventions disclosed in the present application will be briefly described as follows.

A flow sensor of a typical embodiment includes: (a) a first chip mounting section; and (b) a first semiconductor chip arranged on the first chip mounting section, the first semiconductor chip including, (b1) a flow sensing unit formed on a main surface of a first semiconductor substrate, and (b2) a diaphragm formed in a region opposing the flow sensing unit in a rear surface on the opposite side of the main surface of the first semiconductor substrate. And a part of the first semiconductor chip is sealed with a sealing body including a resin while the flow sensing unit formed on the first semiconductor chip is exposed. Further, at an arbitrary cross-section parallel to an advancing direction of gas flowing on the exposed flow sensing unit, an upper surface of the resin making contact with an end of the first semiconductor chip is lower than an upper surface of the first semiconductor chip and a cavity is formed on an upper surface of the resin.

Effects of the Invention

The effects obtained by typical aspects of the present invention will be briefly described below.

The performance variation for each flow sensor can be suppressed, and the performance can be enhanced.

BRIEF DESCRIPTIONS OF THE DRAWINGS

FIG. 23A is a plan view showing a mounting configuration of a flow sensor according to a second embodiment, FIG. 23B is a cross-sectional view taken along the line A-A of FIG. 23A, and FIG. 23C is a cross-sectional view taken along line B-B of FIG. 23A.

DETAILED DESCRIPTION

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference symbols throughout the drawings for describing the embodiments, and a repetitive description thereof is omitted. Also, in some drawings used in the embodiments, hatching is used even in a plan view so as to make the drawings easy to see.

First Embodiment

<Circuit Configuration of Flow Sensor>

Figure 1:
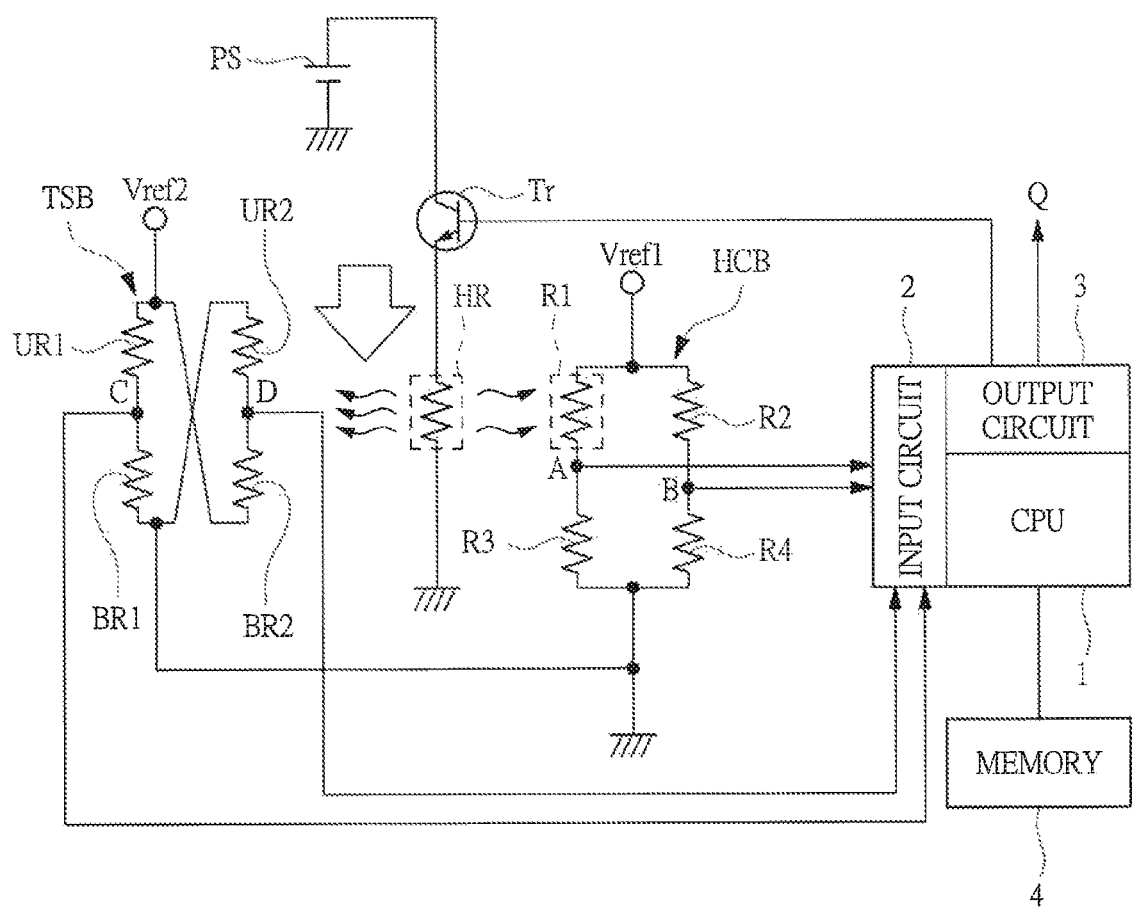
FIG. 1 is a circuit block diagram showing a circuit configuration of a flow sensor according to a first embodiment.

First, a circuit configuration of a flow sensor will be described. FIG. 1 is a circuit block diagram showing a circuit configuration of a flow sensor according to a first embodiment. In FIG. 1, the flow sensor of the first embodiment has, to begin with, a CPU (Central Processing Unit) 1 for controlling the flow sensor, and further, an input circuit 2 for inputting an input signal to this CPU1, and an output circuit 3 for outputting an output signal from the CPU1. The flow sensor is provided with a memory 4 for storing data, and the CPU1 has an access to the memory 4 and can refer to data stored in the memory 4.

Next, the CPU1 is connected to a base electrode of a transistor Tr through the output circuit 3. A collector electrode of this transistor Tr is connected to a power supply PS, and an emitter electrode of the transistor Tr is connected to aground (GND) through a heating resistor HR. Consequently, the transistor Tr is controlled by the CPU1. That is, the base electrode of the transistor Tr is connected to the CPU1 through the output circuit 3 so that an output signal from the CPU1 is inputted to the base electrode of the transistor Tr.

As a result, a current flowing through the transistor Tr is controlled by the output signal (control signal) from the CPU1. When the current flowing through the transistor Tr is increased in accordance with the output signal from the CPU1, the current supplied to the heating resistor HR from the power supply PS is increased, and the amount of heating of the heating resistor HR is increased.

On the other hand, when the current flowing through the transistor Tr is decreased in accordance with the output signal from the CPU1, the current supplied to the heating resistor HR is decreased, and the amount of heating of the heating resistor HR is decreased.

In this manner, it is found that the flow sensor of the first embodiment is configured such that the amount of the current flowing through the heating resistor HR is controlled by the CPU1 and thus, the amount of heating from the heating resistor HR is controlled by the CPU1.

Subsequently, in the flow sensor of the first embodiment, since the current flowing through the heating resistor HR is controlled by the CPU1, a heater control bridge HCB is provided. This heater control bridge HCB is configured such that the amount of heating dissipated from the heating resistor HR is detected and the result of this detection is outputted to the input circuit 2. As a result, the CPU1 can input the detection result from the heater control bridge HCB, and based on this detection result, controls the current flowing through the transistor Tr.

Specifically, the heater control bridge HCB, as shown in FIG. 1, has resistors R1 to R4 configuring a bridge between a reference voltage Vref1 and the ground (GND). In the heater control bridge HCB thus configured, when temperature of a gas heated by the heating resistor HR is higher than an intake-air temperature by a certain specific temperature ($\Delta T$, for example, 100° C.), resistance values of the resistors R1 to R4 are set such that a potential difference between a node A and a node B is 0 V. In other words, the resistors R1 to R4 configuring the heater control bridge HCB configure a bridge in such a manner that a constituent element connecting the resistor R1 and the resistor R3 in series and a constituent element connecting the resistor R2 and the resistor R4 in series are connected in parallel between the reference voltage Vref1 and the ground (GND). The connecting point between the resistor R1 and the resistor R3 becomes the node A, and the connecting point between the resistor R2 and the resistor R4 becomes the node B.

At this time, the gas heated by the heating resistor HR is brought into contact with the resistor R1 configuring the heater control bridge HC. Consequently, the resistance value of the resistor R1 configuring the heater control bridge HCB is mainly changed by the amount of heating from the heating resistor HR. When the resistance value of the resistor R1 is changed in this manner, the potential difference between the node A and the node B is changed. Since this potential difference between the node A and the node B is inputted to the CPU1 through the input circuit 2, the CPU1 controls the current flowing through the transistor Tr based on the potential difference between the node A and the node B.

Specifically, the CPU1 controls the amount of heating from the heating resistor HR by controlling the current flowing through the transistor Tr so that the potential difference between the node A and the node B becomes 0 V. That is, it is found that the flow sensor according to the first embodiment is configured such that the CPU1 performs a feed back control based on the output of the heater control bridge HCB in order to maintain the temperature of the gas heated by the heating resistor HR at a specific value higher by a certain specific temperature ($\Delta T$, for example, 100° C.).

Subsequently, the flow sensor according to the first embodiment has a temperature sensor bridge TSB for detecting a flow rate of the gas. This temperature sensor bridge TSB includes four resistance thermometers configuring a bridge between a reference voltage Vref2 and the ground (GND). These four resistance thermometers include two upstream resistance thermometers UR1 and UR2 and two downstream resistance thermometers BR1 and BR2.

That is, the arrow direction of FIG. 1 shows a gas flow direction, and the upstream side of the gas flow direction is provided with the upstream resistance thermometers UR1 and UR2, and the downstream side is provided with the downstream resistance thermometers BR1 and BR2. These upstream resistance thermometers UR1 and UR2 and the downstream resistance thermometers BR1 and BR2 are arranged such that a distance to the heating resistor HR is the same.

In the temperature sensor bridge TSB, the upstream resistance thermometer UR1 and the downstream resistance thermometer BR1 are connected in series between the reference voltage Vref2 and the ground (GND), and this connecting point of the upstream resistance thermometer UR1 and the downstream resistance thermometer BR1 is a node C.

On the other hand, the upstream resistance thermometer UR2 and the downstream resistance thermometer BR2 are connected in series between the ground (GND) and the reference voltage Vref2, and this connecting point of the upstream resistance thermometer UR2 and the downstream resistance thermometer BR2 is a node D. The potentials of the node C and the node D are inputted to the CPU1 through the input circuit 2. When a windless state exists, in which a flow rate of the gas flowing in the arrow direction is zero, each resistance value of the upstream resistance thermometers UR1 and UR2 and the downstream resistance thermometers BR1 and BR2 is set such that the potential difference between the node C and the node D is 0 V.

Specifically, the upstream resistance thermometers UR1 and UR2 and the downstream resistance thermometers BR1 and BR2 are equal to each other in distance from the heating resistor HR, and are equal to each other in resistance value. Hence, it is found that the temperature sensor bridge TSB is configured such that the potential difference between the node C and the node D is 0 V if the windless state exists regardless of the amount of heating of the heating resistor HR.

<Operation of Flow Sensor>

The flow sensor according to the first embodiment is configured as described above, and its operation will be described below with reference to FIG. 1. First, the CPU1 supplies the current to the transistor Tr by outputting an output signal (control signal) to the base electrode of the transistor Tr through the output circuit 3. Then, the current flows into the heating resistor HR connected to the emitter electrode of the transistor Tr from the power supply PS that is connected to the collector electrode of the transistor Tr. Hence, the heating resistor HR produces heat. The gas warmed by heat generation from the heating resistor HR heats the resistor R1 that configures the heater control bridge HCB.

At this time, when the gas warmed by the heating resistor HR becomes higher by a specific temperature (for example, 100° C.), each resistance value of the resistors R1 to R4 is set such that the potential difference between the node A and the node B of the heater control bridge HCB is 0 V. Hence, for example, when the gas warmed by the heating resistor HR becomes higher by a specific temperature (for example, 100° C.), the potential difference between the node A and the node B of the heater control bridge HCB is 0 V, and this potential difference (0 V) is inputted to the CPU1 through the input circuit 2. The CPU1 which recognizes that the potential difference from the heater control bridge HCB is 0 V outputs an output signal (control signal) for maintaining the existing amount of current to the base electrode of the transistor Tr through the output circuit 3.

On the other hand, when the gas warmed by the heating resistor HR is shifted from a specific temperature (for example, 100° C.), a potential difference being not 0 V occurs between the node A and the node B of the heater control bridge HCB, and this potential difference is inputted to the CPU1 through the input circuit 2. The CPU1 which recognizes that the potential difference occurs from the heater control bridge HCB outputs an output signal (control signal) by which the potential difference becomes 0 V to the base electrode of the transistor Tr through the output circuit 3.

For example, when the potential difference occurs in the direction where the gas warmed by the heating resistor HR becomes higher by a specific temperature (for example, 100° C.), the CPU1 outputs a control signal (output signal) by which the current flowing through the transistor Tr is decreased to the base electrode of the transistor Tr. In contrast to this, when the potential difference occurs in the direction where the gas warmed by the heating resistor HR becomes lower than a specific temperature (for example, 100° C.), the CPU1 outputs a control signal (output signal) by which the current flowing through the transistor Tr is increased to the base electrode of the transistor Tr.

By operating as described above, the CPU1 performs a feedback control based on the output signal from the heater control bridge HCB so that the potential difference between the node A and the node B of the heater control bridge HCB is 0 V (equilibrium state). From this, it is understood that the gas warmed by the heating resistor HR is controlled to become a specific temperature in the flow sensor of the first embodiment.

Next, an operation for measuring the flow rate of the gas by the flow sensor according to the first embodiment will be described. First, the case where a windless state exists will be described. When the windless state exists in which the flow rate of the gas flowing to the arrow direction is zero, each resistance value of the upstream resistance thermometers UR1 and UR2 and the downstream resistance thermometers BR1 and BR2 is set such that the potential difference between the potential of the node C and the node D of the temperature sensor bridge TSB is 0 V.

Specifically, the upstream resistance thermometers UR1 and UR2 and the downstream resistance thermometers BR1 and BR2 are configured to be equal in distance from the heating resistor HR, and also equal in resistance value. Hence, if the temperature sensor bridge TSB is in a windless state regardless of the amount of heating of the heating resistor HR, the potential difference between the node C and the node D becomes 0 V, and this potential difference (0V) is inputted to the CPU1 through the input circuit 2. The CPU1 which recognizes that the potential difference from the temperature sensor bridge TSB is 0 V recognizes that the flow rate of the gas flowing to the arrow direction is zero, and an output signal showing that the flow rate Q of the gas flowing through the output circuit 3 is zero is outputted from the flow sensor of the first embodiment.

Subsequently, a situation where the gas flows in the arrow direction of FIG. 1 is assumed. In this case, as shown in FIG. 1, the upstream resistance thermometers UR1 and UR2 arranged on the upper stream side in the gas flow direction are cooled by the gas flowing to the arrow direction. Hence, the temperatures of the upstream resistance thermometers UR1 and UR2 are dropped, whereas the downstream resistance thermometers BR1 and BR2 arranged on the downstream side in the gas flow direction rise in temperature since the gas warmed by the heating resistor HR flows to the downstream resistance thermometer BR1 and BR2. As a result, the balance of the temperature sensor bridge TSB is lost, and the potential difference being not 0 V occurs between the node C and the node D of the temperature sensor bridge TSB.

This potential difference is inputted to the CPU1 through the input circuit 2. Then, the CPU1, which has recognized that the potential difference from the temperature sensor bridge TSB is not zero, recognizes that the flow rate of the gas flowing in the arrow direction is not zero. After that, the CPU1 accesses the memory 4. Since the memory 4 stores a contrast list (table) corresponding to the potential difference and the gas flow rate, the CPU1 having an access to the memory 4 calculates the gas flow rate Q from the contrast table stored in the memory 4. In this way, the gas flow rate Q calculated by the CPU1 is outputted from the flow sensor of the first embodiment through the output circuit 3. According to the operation performed as described above, it is understood that the flow rate of the gas can be obtained according to the flow sensor of the first embodiment.

<Layout Configuration of Flow Sensor>

Next, a layout configuration of the flow sensor of the first embodiment will be described. For example, the flow sensor of the first embodiment shown in FIG. 1 is formed in the two semiconductor chips. Specifically, the heating resistor HR, the heat control bridge HCB, and the temperature sensor bridge TSB are formed on one semiconductor chip, whereas the CPU1, the input circuit 2, the output circuit 3, the memory 4 and the like are formed on the other semiconductor chip. The layout configuration of the semiconductor chip formed with the heating resistor HR, the heater control bridge HCB, and the temperature sensor bridge TSB will be described below.

Figure 2:
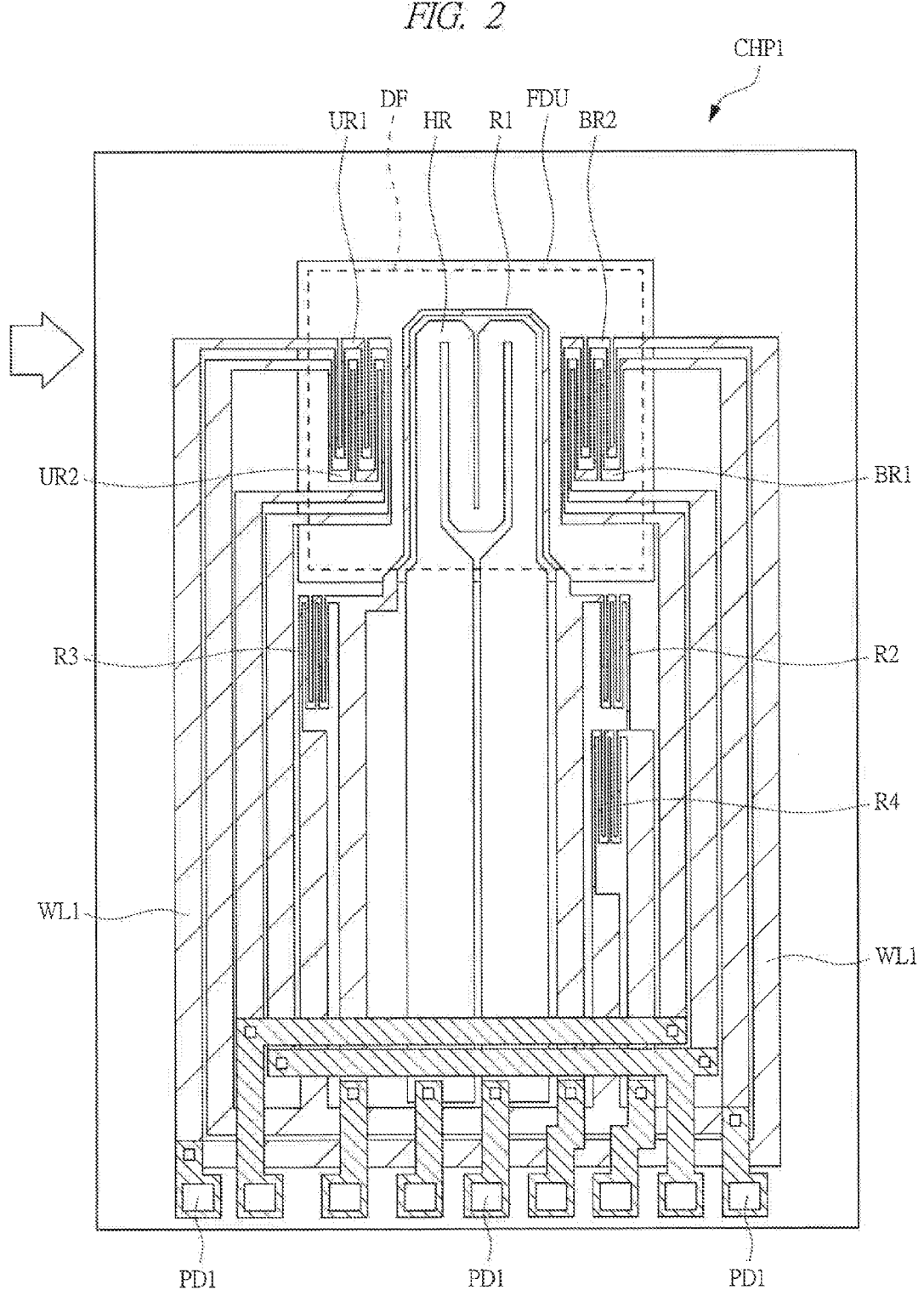
FIG. 2 is a plan view showing a layout configuration of a semiconductor chip configuring a part of the flow sensor according to the first embodiment.

FIG. 2 is a plan view showing the layout configuration of a semiconductor chip CHP1 that configures a part of the flow sensor of the first embodiment. First, as shown in FIG. 2, the semiconductor chip CHP1 is in a rectangular shape, and the gas flows from the left side of this semiconductor chip CHP1 to the right side (arrow direction). As shown in FIG. 2, a diaphragm DF having a rectangular shape is formed on the rear surface of the rectangular shaped semiconductor chip CHP1. The diaphragm DF means a thin plate region in which the thickness of the semiconductor chip CHP1 is made thin. In other words, the thickness of the region in which the diaphragm DF is formed is made thinner than the thicknesses of the region of the other semiconductor chip CHP1.

The surface region of the semiconductor chip CHP1 facing the rear surface region formed with the diaphragm in this manner is formed with the flow sensing unit FDU as shown in FIG. 2. Specifically, the central part of this flow sensing unit FDU is formed with the heating resistor HR, and around this heating resistor HR, the resistor R1 configuring the heat control bridge is formed. On the outer side of the flow sensing unit FDU, the resistors R2 to R4 configuring the heater control bridge are formed. By the resistors R1 to R4 formed in this way, the heater control bridge is formed.

Particularly, since the resistor R1 configuring the heater control bridge is formed in the vicinity of the heating resistor HR, the temperature of the gas warmed by heat generation from the heating resistor HR can be reflected to the resistor R1 with sufficient accuracy.

On the other hand, since the resistors R2 to R4 configuring the heater control bridge are arranged away from the heating resistor HR, the resistors R2 to R4 are hardly affected by heat generation from the heating resistor HR.

As a consequence, the resistor R1 can be configured to sensitively react to the temperature of the gas warmed by the heating resistor HR, whereas the resistors R2 to R4 can be configured to be hardly affected by the heating resistor HR and easy to maintain the resistance value at a specific value. Hence, the detection accuracy of the heater control bridge can be enhanced.

In addition, the upstream resistance thermometers UR1 and UR2 and the downstream resistance thermometers BR1 and BR2 are arranged in such a manner as to clamp the heating resistor HR formed on the flow sensing unit FDU. Specifically, the upstream resistance thermometers UR1 and UR2 are formed on the upstream side in the arrow direction to which the gas flows, and the downstream resistance thermometers BR1 and BR2 are formed on the downstream side in the arrow direction to which the gas flows.

With such a configuration, when the gas flows to the arrow direction, the temperatures of the upstream resistance thermometers UR1 and UR2 can be lowered, and the temperatures of the downstream resistance thermometers BR1 and BR2 can be increased. In this way, the temperature sensor bridge can be formed by the upstream resistance thermometers UR1 and UR2 and the downstream resistance thermometers BR1 and BR2 that are arranged in the flow sensing unit FDU.

The heating resistor HR, the upstream resistance thermometers UR1 and UR2, and the downstream resistance thermometers BR1 and BR2 described above are formed by patterning by a method such as ion etching after forming, for example, a metal film such as platinum and/or a semiconductor thin film such as polysilicon (polycrystalline silicon) by methods such as sputtering method, CVD (Chemical Vapor Deposition) method and/or the like.

The heating resistor HR thus configured, the resistors R1 to R4 configuring the heater control bridge, and the upstream resistance thermometers UR1 and UR2 and the downstream resistance thermometers BR1 and BR2 configuring the temperature sensor bridge are connected to wirings WL1, respectively, and are pulled out to pads PD1 arranged along the lower side of the semiconductor chip CHP1.

Thus, the semiconductor chip CHP1 configuring a part of the flow sensor of the first embodiment is laid out. The actual flow sensor has one semiconductor chip formed with the heating resistor HR, the heater control bridge HCB, and the temperature sensor bridge TSB, and another semiconductor chip formed with the CPU1, the input circuit 2, the output circuit 3, the memory 4 and the like, and mounts these semiconductor chips on the board. The flow sensor thus mounting these semiconductor chips on the board will be described below.

First, the mounting configuration of the flow sensor in the existing technology will be described. Then, the problem on the mounting configuration of the flow sensor in an existing technology will be described, and the mounting configuration of the flow sensor of the first embodiment devised to solve the problem on the mounting configuration of the flow sensor in the existing technology will be described.

<Description of Existing Technology>

Figure 3:
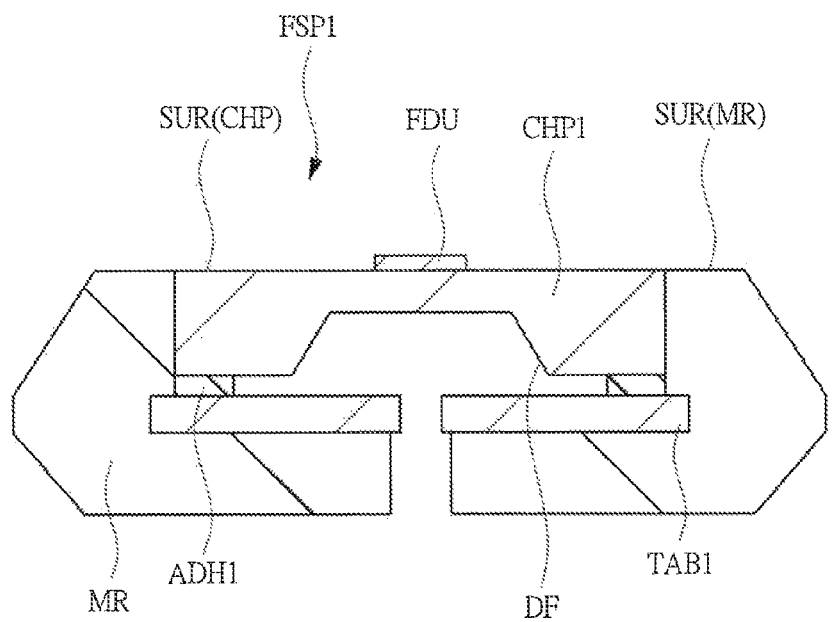
FIG. 3 is a cross-sectional view showing a configuration of a flow sensor according to a first existing technology.

FIG. 3 is a cross-sectional view showing a configuration of a flow sensor FSP1 according to a first existing technology. As shown in FIG. 3, the flow sensor FSP1 according to the first existing technology includes the semiconductor chip CHP1 on the chip mounting section TAB1, which semiconductor chip CHP1 is adhered to the chip mounting section TAB1 with an adhesive material ADH1. On a main surface (upper surface, front surface) of the semiconductor chip CHP1 is formed the flow sensing unit FDU, and on a rear surface of the semiconductor chip CHP1 is formed a diaphragm (thin plate section) DF at a position opposing the flow sensing unit FDU. In the flow sensor FSP1 according to the first existing technology, a part of the semiconductor chip CHP1 and a part of the chip mounting section TAB1 are sealed with a sealing body containing the resin MR. Specifically, in the flow sensor FSP1 according to the first existing technology, the resin MR is formed to cover the side surfaces of the semiconductor chip CHP1 while exposing the flow sensing unit FDU formed on the upper surface of the semiconductor chip CHP1. In this case, in the flow sensor FSP1 according to the first existing technology, the upper surface SUR (CHP) of the semiconductor chip CHP1 and the upper surface SUR (MR) of the resin MR are flush.

Figure 4:
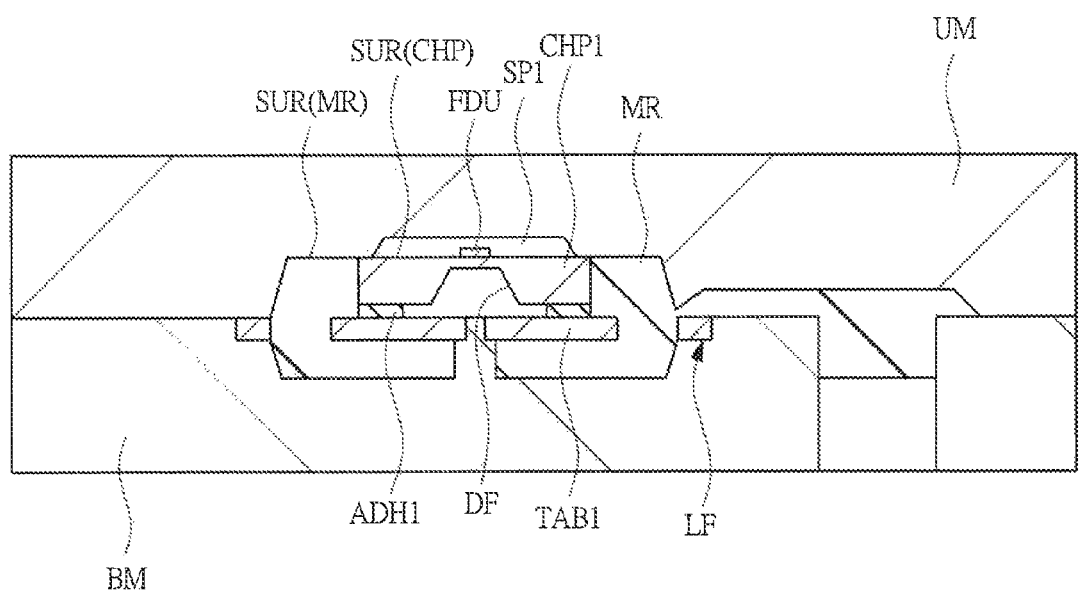
FIG. 4 is a cross-sectional view showing a step of resin sealing the flow sensor according to the first existing technology.

The flow sensor FSP1 according to the first existing technology configured as above is, for example, resin sealed by the manufacturing step shown in FIG. 4. FIG. 4 is a cross-sectional view showing a step of resin sealing the flow sensor FSP1 in the first existing technology. As shown in FIG. 4, the semiconductor chip CHP1 is fixed on the chip mounting section TAB1 formed in a lead frame LF with the adhesive material ADH1. The lead frame LF mounted with the semiconductor chip CHP1 is then sandwiched with an upper mold UM and a bottom mold BM by way of a second space. Thereafter, the resin MR is flowed into the second space under heating to seal apart of the semiconductor chip CHP1 with the resin MR.

In this case, as shown in FIG. 4, the internal space of the diaphragm DF is isolated with the second space described above by the adhesive material ADH1, so that the resin MR can be prevented from entering the internal space of the diaphragm DF even when filling the second space with the resin MR.

The upper mold UM is formed with a depressed portion to ensure a first space SP1 (sealed space) surrounding the flow sensing unit FDU formed on the upper surface SUR (CHP) of the semiconductor chip CHP1. Thus, when the upper mold UM is pushed against the semiconductor chip CHP1, the side surfaces of the semiconductor chip CHP1 can be sealed, for example, while ensuring the first space SP1 (sealed space) surrounding the flow sensing unit FDU formed on the semiconductor chip CHP1 and the region in the vicinity thereof by the recessed portion formed in the upper mold UM. In other words, according to the first existing technology, a part of the semiconductor chip CHP1 can be sealed while exposing the flow sensing unit FDU formed on the semiconductor chip CHP1 and the region in the vicinity thereof.

In the first existing technology, the upper surface SUR (CHP) of the semiconductor chip CHP1 and the upper surface SUR (MR) of the resin MR covering the side surfaces of the semiconductor chip CHP1 are substantially in flush since the upper mold UM is directly pushed against the upper surface SUR (CHP) of the semiconductor chip CHP1.

In such first existing technology, this can be carried out with the semiconductor chip CHP1 formed with the flow sensing unit FDU fixed with the mold, so that a part of the semiconductor chip CHP1 can be sealed with the resin MR while suppressing the position shift of the semiconductor chip CHP1. According to the method for manufacturing the flow sensor FSP1 in the first existing technology, this means that a part of the semiconductor chip CHP1 can be sealed with the resin MR while suppressing the position shift of each flow sensor, and means that the variation in the position of the flow sensing unit FDU formed on the semiconductor chip CHP1 can be suppressed. As a result, according to the first existing technology, the position of the flow sensing unit FDU for sensing the flow of the gas can be coincide in each flow sensor, whereby the variation in the performance of sensing the gas flow can be suppressed in each flow sensor. That is, according to the first existing technology of sealing a part of the semiconductor chip CHP1 while fixing with the mold, the performance variation for every flow sensor FSP1 can be suppressed compared to the technology that uses the potting resin.

However, the first existing technology has the following problems since a part of the semiconductor chip CHP1 is sealed with the resin MR while bringing the upper mold UM directly in contact with the upper surface SUR (CHP) of the semiconductor chip CHP1.

For example, since the dimensional variation exists in the thickness of the individual semiconductor chip CHP1, a gap forms when sandwiching the lead frame LF mounted with the semiconductor chip CHP1 with the upper mold UM and the bottom mold BM when the thickness of the semiconductor chip CHP1 is thinner than an average thickness, and the resin MR leaks out from such gap to the flow sensing unit FDU.

When the thickness of the semiconductor chip CHP1 is thicker than the average thickness, a force applied on the semiconductor chip CHP1 becomes large and the semiconductor chip CHP1 may rupture when sandwiching the lead frame LF mounted with the semiconductor chip CHP1 with the upper mold UM and the bottom mold BM. Thus, it can be recognized that the possibility the problems originating from the dimensional variation of the component may arise is high in the first existing technology.

Figure 5:
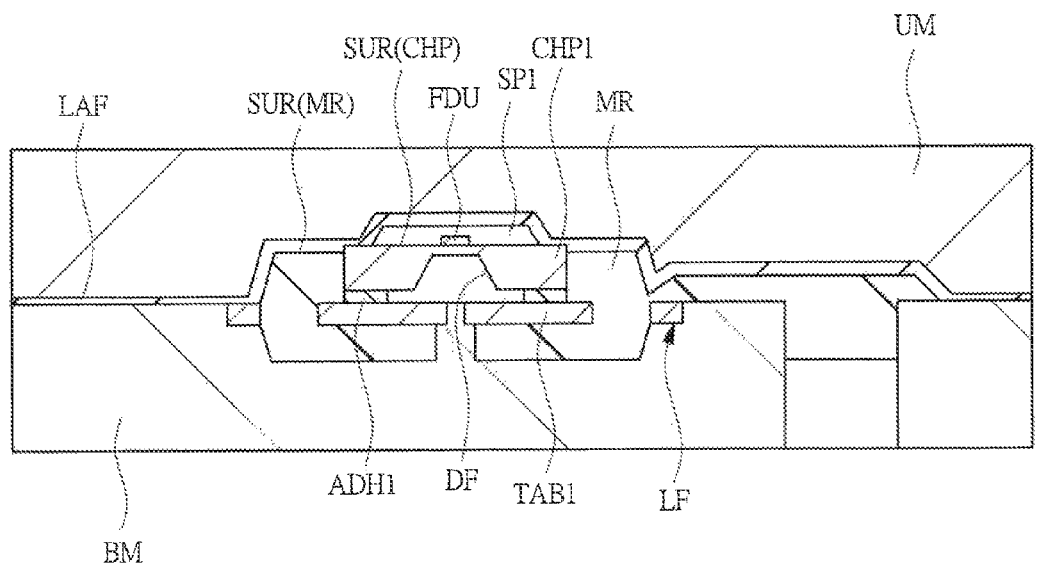
FIG. 5 is a cross-sectional view showing a step of resin sealing a flow sensor according to a second existing technology.

In a second existing technology, therefore, a devisal to interpose an elastic body film LAF between the lead frame LF mounted with the semiconductor chip CHP1 and the upper mold UM is performed, as shown in FIG. 5, for example, to prevent the resin leakage to the flow sensing unit FDU originating from the thickness variation of the semiconductor chip CHP1 or the rupture of the semiconductor chip CHP1. Thus, for example, although a gap forms when sandwiching the lead frame LF mounted with the semiconductor chip CHP1 with the upper mold UM and the bottom mold BM when the thickness of the semiconductor chip CHP1 is thinner than the average thickness, such gap is filled with the elastic body film LAF and hence the resin leakage to the semiconductor chip CHP1 can be prevented.

When the thickness of the semiconductor chip CHP1 is thicker than the average thickness, the dimension in the thickness direction of the elastic body film LAF changes to absorb the thickness of the semiconductor chip CHP1 since the elastic body film LAF is softer than the semiconductor chip CHP1 when sandwiching the lead frame LF mounted with the semiconductor chip CHP1 with the upper mold UM and the bottom mold BM. Therefore, the force can be prevented from being applied on the semiconductor chip CHP1 more than necessary even if the thickness of the semiconductor chip CHP1 is thicker than the average thickness, and consequently, the rupture of the semiconductor chip CHP1 can be prevented.

That is, according to the method for manufacturing the flow sensor in the second existing technology, the semiconductor chip CHP1 is held down with the upper mold UM by way of the elastic body film LAF. Thus, the mounting variation of the components originating from the thickness variation of the semiconductor chip CHP1, the adhesive material ADH1, and the lead frame LF can be absorbed by the change in thickness of the elastic body film LAF. Therefore, according to the second existing technology, a clamp force applied on the semiconductor chip CHP1 can be alleviated. As a result, breakage represented by split, chip, crack, or the like of the semiconductor chip CHP1 can be prevented. In other words, according to the method for manufacturing the flow sensor in the second existing technology, the problems of the first existing technology represented by split, chip, crack, or the like of the semiconductor chip CHP1 involved in the increase in the clamp force originating from the mounting variation of the component can be resolved.

However, the inventor of the present invention reviewed the second existing technology, and found the following problems of the second existing technology. Such problems will be described below.

For example, a technology of sealing the semiconductor chip configuring the flow sensor with resin includes the second existing technology of clamping a component such as the semiconductor chip CHP1, and the like with the mold installed with the elastic body film (separation film sheet) and sealing the same with the resin MR. The second existing technology has an advantage in that the mounting dimensional variation of the component such as the semiconductor chip CHP1, the lead frame LF, and the like can be absorbed with the dimensional change in the thickness direction of the elastic body film LAF.

Specifically, FIG. 5 is a cross-sectional view showing a step of injecting the resin MR into the second space formed between the upper mold UM and the bottom mold BM with the component such as the semiconductor chip CHP1, and the like mounted on the chip mounting section TAB1 of the lead frame LF clamped by the bottom mold BM and the upper mold UM installed with the elastic body film LAF. In particular, FIG. 5 shows a cross-sectional view in the flow direction of the air (gas) of the flow sensor. As shown in FIG. 5, the end of the semiconductor chip CHP1 is pushed down with the upper mold UM by way of the elastic body film LAF, so that the semiconductor chip CHP1 is fixed with the upper mold UM.

In this case, the elastic body film LAF sandwiched by the upper surface SUR (CHP) of the semiconductor chip CHP1 and the upper mold UM is compressed in the film thickness direction by the pressure pushed down from the upper mold UM, and thus the film thickness dimension of the elastic body film LAF is reduced. In a region adjacent to the semiconductor chip CHP1, the upper mold UM does not push down the semiconductor chip CHP1 and the second space is formed, and hence the elastic body film LAF existing n the second space is not compressed in the film thickness direction. As a result, the film thickness of the elastic body film LAF sandwiched by the semiconductor chi CHP1 and the upper mold UM becomes smaller than the film thickness of the elastic body film LAF arranged in the second space, as shown in FIG. 5. Since the resin MR is injected into the second space, the position of the upper surface SUR (MR) of the resin MR consequently becomes lower than the position of the upper surface SUR (CHP) of the semiconductor chip CHP1.

Therefore, when sealing the semiconductor chip CHP1 with the resin MR through the manufacturing method shown in FIG. 5, the flow sensor in which the position of the upper surface SUR (MR) of the resin MR is lower than the position of the upper surface SUR (CHP) of the semiconductor chip CHP1 is manufactured.

In this case, the disturbance of the air at the upper side of the flow sensing unit FDU occurs, and a problem in that the measurement of the air flow in the flow sensing unit FDU becomes unstable arises. The mechanism therefor will be described below.

Figure 6:
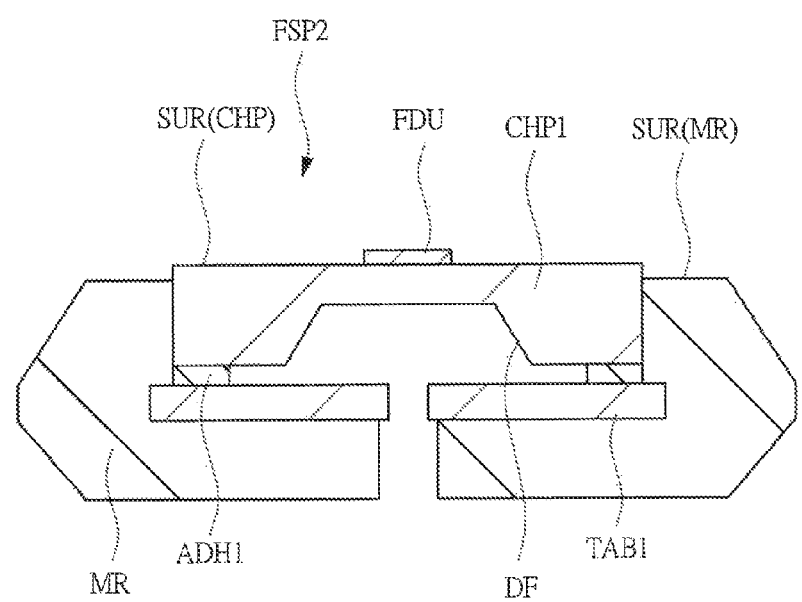
FIG. 6 is a diagram showing a cross-sectional structure in a flow direction of air (gas) of the flow sensor according to the second existing technology.

FIG. 6 is a diagram showing a cross-sectional structure in the flow direction of the air (gas) of a flow sensor FSP2 manufactured by the manufacturing method shown in FIG. 5. As shown in FIG. 6, the semiconductor chip CHP1 is mounted on the chip mounting section TAB1 by the adhesive material ADH1, and the upper surface SUR (CHP) of the semiconductor chip CHP1 is exposed from the resin MR. In other words, the flow sensing unit FDU formed on the upper surface SUR (CHP) of the semiconductor chip CHP1 is exposed from the resin MR, and the position of the upper surface SUR (CHP) of the semiconductor chip CHP1 is higher than the position of the upper surface SUR (MR) of the resin MR. Assume that the gas (air) is flowing on the upper side of the flow sensing unit FDU in the flow sensor FSP2 configured as above.

Figure 7:
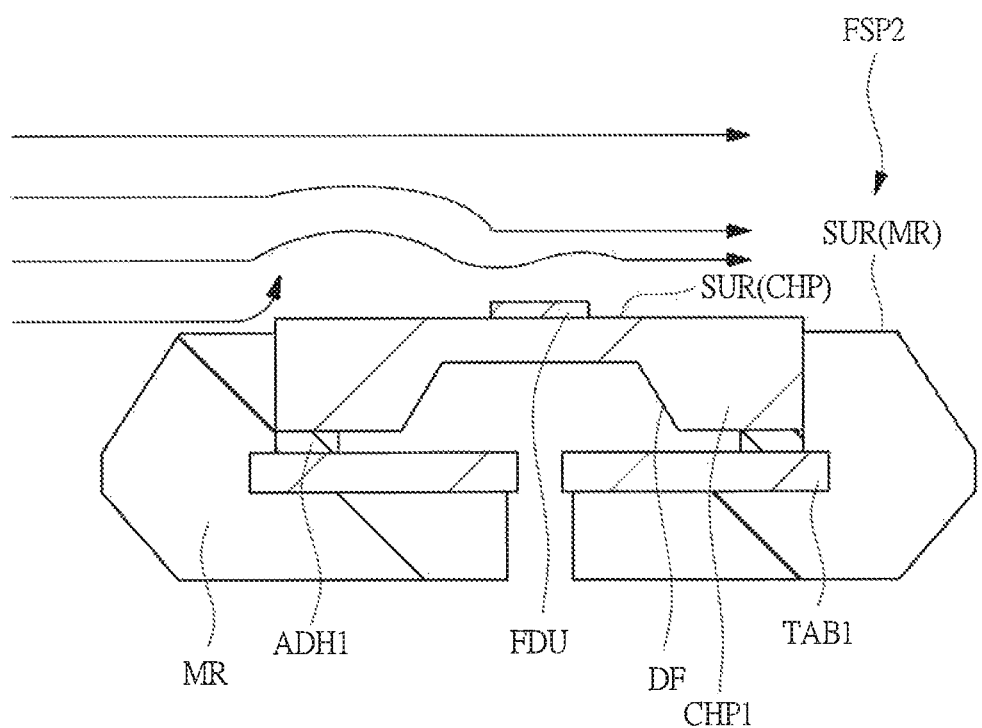
FIG. 7 is a diagram showing a state in which the gas (air) flows from a left side toward a right side in a plane of drawing on the flow sensor according to the second existing technology.

In FIG. 7, a state in which the gas (air) is flowing from the left side toward the right side in the plane of drawing on the flow sensor FSP2 is shown. As shown in FIG. 7, the gas (air) flowing from the left side in the plane of drawing first passes the upper side of the resin MR of the flow sensor FSP2. When the gas (air) flows from the upper side of the resin MR toward the upper side of the semiconductor chip CHP1, the gas (air) collides to the projecting side surface of the semiconductor chip CHP1 from the upper surface SUR (MR) of the resin MR, which height is low, since the upper surface SUR (MR) of the resin is at a position lower than the upper surface SUR (CHP) of the semiconductor chip CHP1. The flow of gas (air) is thus disturbed, and the gas (air) greatly changes toward the upper side of the semiconductor chip CHP1. Thereafter, the gas (air) that flowed toward the upper side of the semiconductor chip CHP1 again flows in a direction parallel to the upper surface SUR (CHP) of the semiconductor chip CHP1. Therefore, if the upper surface SUR (MR) of the resin MR is lower than the upper surface SUR (CHP) of the semiconductor chip CHP1, the flow of gas (air) is greatly disturbed by the influence of the side surface of the semiconductor chip CHP1 projecting out from the resin MR. As a result of the flow direction of the gas (air) being greatly changed and the flow becoming unstable at the upstream of the flow sensing unit FDU, the flow sensing accuracy in the flow sensing unit FDU becomes unstable.

<Mounting Configuration of Flow Sensor According to First Embodiment>

In the first embodiment, a devisal for solving the problems of the second existing technology is performed. Hereinafter, a mounting configuration of a flow sensor according to the first embodiment performed with such devisal will be described.

Figure 8A:
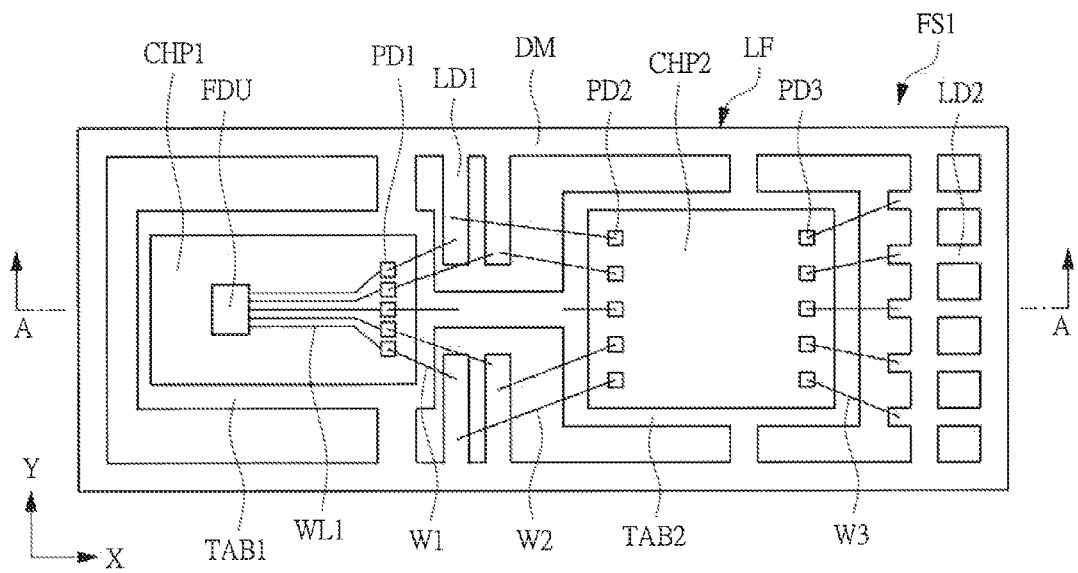
FIG. 8A is a plan view showing a mounting configuration of the flow sensor according to the first embodiment.
Figure 8B:
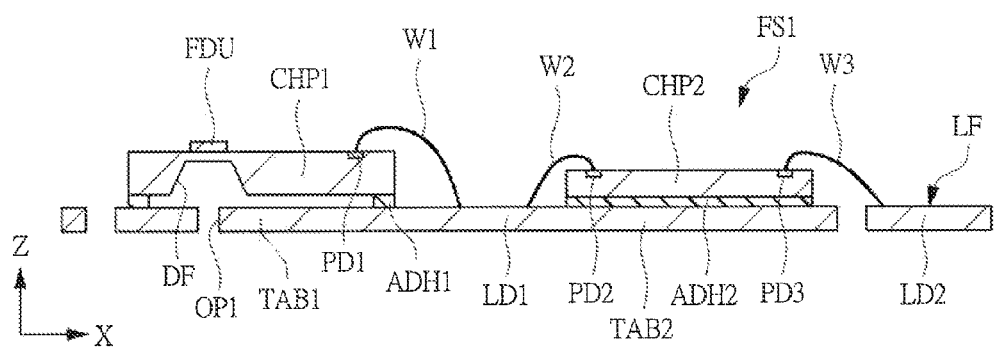
FIG. 8B is a cross-sectional view taken along line A-A of FIG. 8A.
Figure 8C:
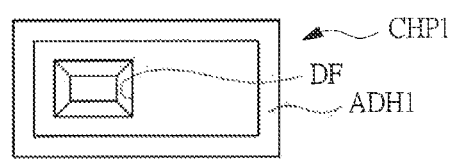
FIG. 8C is a plan view showing a rear surface of the semiconductor chip.

FIG. 8 is a diagram showing a mounting configuration of the flow sensor FS1 according to the first embodiment, and is a diagram showing a configuration of before being sealed with resin. In particular, FIG. 8A is a plan view showing the mounting configuration of the flow sensor FS1 according to the first embodiment. FIG. 8B is a cross-sectional view taken along line A-A of FIG. 8A, and FIG. 8C is a plan view showing a rear surface of a semiconductor chip CHP1.

First, as shown in FIG. 8A, the flow sensor FS1 according to the first embodiment includes a lead frame LF made of copper material, for example. The lead frame LF includes the chip mounting section TAB1 and the chip mounting section TAB2 in an interior surrounded with a dam bar DM configuring an outer frame body. The semiconductor chip CHP1 is mounted on the chip mounting section TAB1 and a semiconductor chip CHP2 is mounted on the chip mounting section TAB2.

The semiconductor chip CHP1 has a rectangular shape, and a flow sensing unit FDU is formed at substantially the central part. A wiring WL1 to connect with the flow sensing unit FDU is formed on the semiconductor chip CHP1, which wiring WL1 is connected with a plurality of pads PD1 formed along one side of the semiconductor chip CHP1. In other words, the flow sensing unit FDU and the plurality of pads PD1 are connected with the wiring WL1. Such pads PD1 are connected with a lead LD1 formed in the lead frame LF by way of a wire W1 made of gold wire, for example. The lead LD1 formed in the lead frame LF is further connected with a pad PD2 formed on the semiconductor chip CHP2 by way of a wire W2 made of gold wire, for example.

An integrated circuit including a semiconductor element such as a MISFET (Metal Insulator Semiconductor Field Effect Transistor), and the like and a wiring is formed on the semiconductor chip CHP2. Specifically, the integrated circuits configuring the CPU 1, the input circuit 2, the output circuit 3, the memory 4, or the like shown in FIG. 1 are formed. Such integrated circuits are connected with the pad PD2 and a pad PD3 serving as an external connecting terminal. The pad PD3 formed on the semiconductor chip CHP2 is connected to a lead LD2 formed in the lead frame LF by way of a wire W3 made of gold wire, for example. It is thus apparent that the semiconductor chip CHP1 formed with the flow sensing unit FDU and the semiconductor chip CHP2 formed with the control circuit are connected by way of the lead LD1 formed in the lead frame LF.

Then, as shown in FIG. 8B, the chip mounting section TAB1 is formed in the lead frame LF, and the semiconductor chip CHP1 is mounted on the chip mounting section TAB1. The semiconductor chip CHP1 is adhered with the chip mounting section TAB1 by the adhesive material ADH1. A diaphragm DF (thin plate section) is formed on the rear surface of the semiconductor chip CHP1, and the flow sensing unit FDU is formed on the front surface of the semiconductor chip CHP1 opposing the diaphragm DF. An opening OP1 is formed at a bottom of the chip mounting section TAB1 existing on the lower side of the diaphragm DF. An example in which the opening OP1 is formed at the bottom of the chip mounting section TAB1 existing on the lower side of the diaphragm DF is shown herein, but the technical concept of the first embodiment is not limited thereto, and the lead frame LF that is not formed with the opening OP1 may be used.

Furthermore, as shown in FIG. 8B, the pad PD1 connected with the flow sensing unit FDU is formed other than the flow sensing unit FDU on the front surface (upper surface) of the semiconductor chip CHP1, which pad PD1 is connected to the lead LD1 formed in the lead frame LF by way of the wire W1. The semiconductor chip CHP2 is also mounted on the lead frame LF other than the semiconductor chip CHP1, which semiconductor chip CHP2 is adhered to the chip mounting section TAB2 by an adhesive material ADH2. Moreover, the pad PD2 formed on the semiconductor chip CHP2 and the lead LD1 formed in the lead frame LF are connected by way of the wire W2. The pad PD3 formed on the semiconductor chip CHP2 and the lead LD2 formed in the lead frame LF are electrically connected by way of the wire W3.

The adhesive material ADH1 adhering the semiconductor chip CHP1 and the chip mounting section TAB1, and the adhesive material ADH2 adhering the semiconductor chip CHP2 and the chip mounting section TAB2 may be, for example, an adhesive material having a thermosetting resin such as epoxy resin, polyurethane resin, and the like as a component, or an adhesive material having a thermoplastic resin such as polyimide resin, acryl resin, fluorine resin, or the like as a component.

For example, the adhesion of the semiconductor chip CHP1 and the chip mounting section TAB1 can be carried out by applying the adhesive material ADH1, a sliver paste, and the like, as shown in FIG. 8C or with a sheet-like adhesive material. FIG. 8C is a plan view showing the rear surface of the semiconductor chip CHP1. As shown in FIG. 8C, the diaphragm DF is formed on the rear surface of the semiconductor chip CHP1, and the adhesive material ADH1 is applied to surround such diaphragm DF. In FIG. 8C, an example of applying the adhesive material ADH1 so as to surround the diaphragm DF in a square shape is shown, but this is not the sole case, and the adhesive material ADH1 may be applied so as to surround the diaphragm. DF in an arbitrary shape such as an elliptical shape, for example.

In the flow sensor FS1 of the first embodiment, the mounting configuration of the flow sensor FS1 before being sealed with the resin is configured as above, and now, the mounting configuration of the flow sensor FS1 after being sealed with resin will be described below.

Figure 9A:
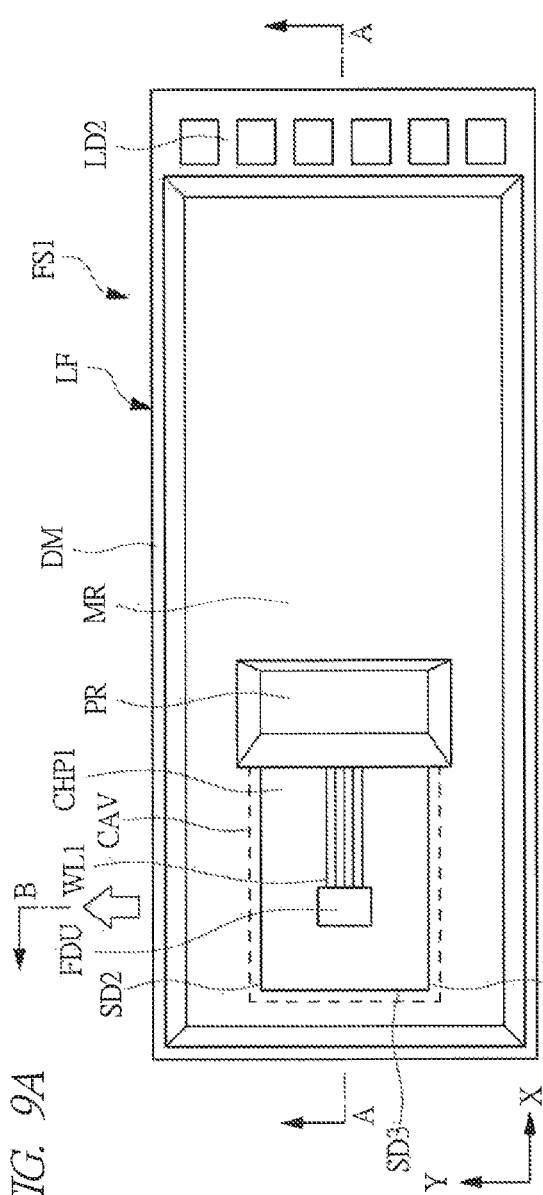
FIG. 9A is a plan view showing a mounting configuration of the flow sensor according to the first embodiment.
Figure 9B:
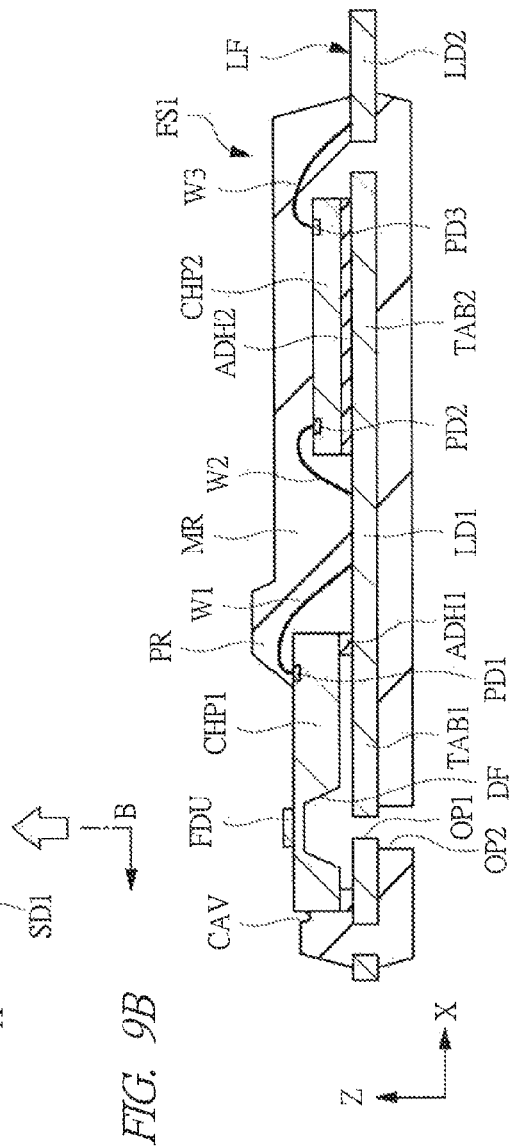
FIG. 9B is a cross-sectional view taken along line A-A of FIG. 9B.
Figure 9C:
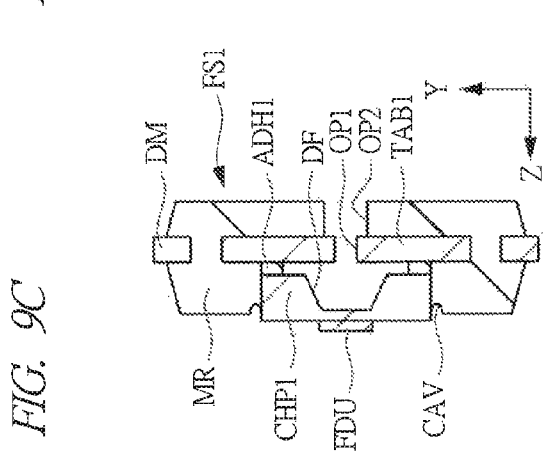
FIG. 9C is a cross-sectional view taken along line B-B of FIG. 9A.

FIG. 9 is a diagram showing a mounting configuration of the flow sensor FS1 according to the first embodiment, and is a diagram showing a configuration of after being sealed with resin. In particular, FIG. 9A is a plan view showing a mounting configuration of the flow sensor FS1 according to the first embodiment. FIG. 9B is a cross-sectional view taken along line A-A of FIG. 9A, and FIG. 9C is a cross-sectional view taken along line B-B of FIG. 9A.

As shown in FIG. 9A, in the flow sensor FS1 according to the first embodiment, a part of the semiconductor chip CHP1 and the entire semiconductor chip CHP2 are covered with the resin MR with the flow sensing unit FDU formed on the semiconductor chip CHP1 exposed. That is, in the first embodiment, a pad forming region of the semiconductor chip CHP1 and the entire region of the semiconductor chip CHP2 are collectively sealed with the resin MR while exposing the region formed with the flow sensing unit FDU. In the first embodiment, a projection PR including the resin MR is formed to cover the wire W1 for electrically connecting to the pad PD formed on the semiconductor chip CHP1, as shown in FIG. 9(A) and FIG. 9B. In other words, the projection PR can be formed in the resin MR (sealing body) to reliably seal the component such as the gold wire (wire) having a high loop height. In the first embodiment, however, the projection PR is not an essential constituent requirement. That is, the projection PR does not need to be arranged in the resin MR (sealing body) as long as the gold wire (wire) for electrically connecting the pad PD1 formed on the semiconductor chip CHP1 and the lead LD1 can be sealed with the resin MR without arranging the projection PR.

The resin MR described above may be, for example, a thermosetting resin such as epoxy resin, phenol resin, and the like, a thermoplastic resin such as polycarbonate, polyethylene terephthalate, and the like, and a filler such as glass, mica, and the like can be mixed in the resin.

According to the first embodiment, the sealing by the resin MR can be carried out with the semiconductor chip CHP1 formed with the flow sensing unit FDU fixed with the mold, and thus a part of the semiconductor chip CHP1 and the semiconductor chip CHP2 can be sealed with the resin MR while suppressing the position shift of the semiconductor chip CHP1. According to the flow sensor FS1 of the first embodiment, this means that a part of the semiconductor chip CHP1 and the entire region of the semiconductor chip CHP2 can be sealed with the resin MR while suppressing the position shift of each flow sensor FS1, and means that the variation in the position of the flow sensing unit FDU formed on the semiconductor chip CHP1 can be suppressed.

As a result, according to the first embodiment, the position of the flow sensing unit FDU for sensing the flow of the gas can be coincided in each flow sensor FS1, so that a significant effect of being able to suppress the performance variation of sensing the gas flow can be obtained in each flow sensor FS1.

In the first embodiment, a configuration of applying the adhesive material ADH1 so as to surround the diaphragm DF formed on the rear surface of the semiconductor chip CHP1, for example, is assumed to be adopted to prevent the resin MR from entering the internal space of the diaphragm DF. As shown in FIG. 9B and FIG. 9C, the opening OP1 is formed at the bottom of the chip mounting section TAB1, which is on the lower side of the diaphragm DF formed on the rear surface of the semiconductor chip CHP1, and furthermore, the opening OP2 is formed in the resin MR covering the rear surface of the chip mounting section TAB1.

Thus, according to the flow sensor FS1 of the present embodiment, the internal space of the diaphragm DF communicates with the external space of the flow sensor FS1 through the opening OP1 formed at the bottom of the chip mounting section TAB1 and the opening OP2 formed in the resin MR. As a result, the pressure of the internal space of the diaphragm DF and the pressure of the external space of the flow sensor FS1 become equal, and application of stress on the diaphragm DF can be suppressed.

In the flow sensor FS1 according to the first embodiment, for example, a cavity CAV is formed in the upper surface SUR (MR) of the resin MR covering the periphery of the semiconductor chip CHP1, as shown in FIG. 9A to FIG. 9C. For example, as shown in FIG. 9A, the cavity CAV is formed along the sides of the semiconductor chip CHP1. Specifically, in FIG. 9A, the cavity CAV is formed along the sides SD1, SD2, SD3 of the semiconductor chip CHP1. Thus, the characteristic of the first embodiment lies in providing the cavity CAV in the upper surface SUR (MR) of the resin MR, and the details thereof will be described below.

Figure 10:
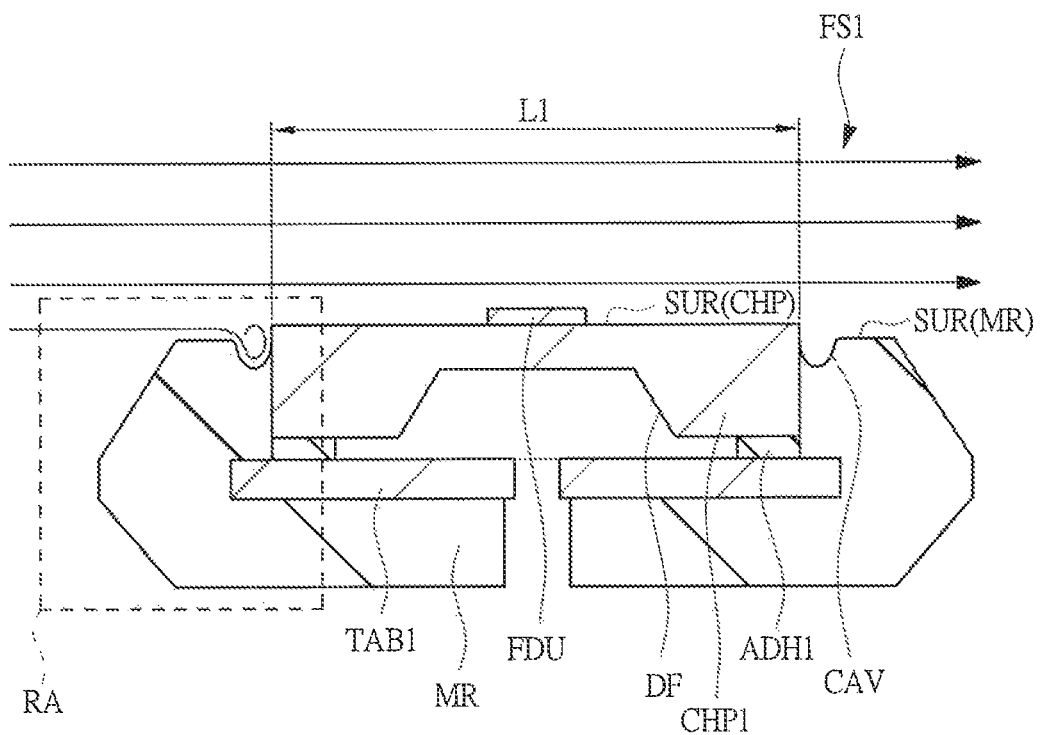
FIG. 10 is a diagram showing one cross-section parallel to an advancing direction of gas (air) flowing on the exposed flow sensing unit in the flow sensor according to the first embodiment.

FIG. 10 is a diagram showing one cross-section parallel to an advancing direction of the gas (air) flowing on the exposed flow sensing unit FDU in the flow sensor FS1 according to the first embodiment. In FIG. 10, the flow sensor FS1 according to the first embodiment includes the chip mounting section TAB1, and the semiconductor chip CHP1 is mounted on the chip mounting section TAB1 by way of the adhesive material ADH1. The flow sensing unit FDU is formed at substantially the central part of the upper surface SUR (CHP) of the semiconductor chip CHP1, and the diaphragm DF (thin plate section) is formed on the rear surface side of the semiconductor chip CHP1 opposing the flow sensing unit FDU. Moreover, a part of the semiconductor chip CHP1 mounted on the chip mounting section TAB1 is sealed with the resin MR. Specifically, a part of the side surface of the semiconductor chip CHP1 is sealed with the sealing body including the resin MR.

In this case, in the first embodiment, the upper surface SUR (CHP) of the semiconductor chip CHP1 is not covered with the resin MR in the one cross-section parallel to the advancing direction of gas (air) flowing on the exposed flow sensing unit FDU, as shown in FIG. 10. Thus, according to the first embodiment, for example, the flow sensing unit FDU can be prevented from being covered with the resin MR even if the miniaturization in size of the semiconductor chip CHP1 formed with the flow sensing unit FDU is forwarded.

Furthermore, in the first embodiment, the upper surface SUR (MR) of the resin MR is lower than the upper surface SUR (CHP) of the semiconductor chip CHP1. This is because the resin sealing is performed with the elastic body film. LAF attached to the upper mold UM even in the flow sensor FS1 of the first embodiment, similar to the second existing technology. Therefore, even in the first embodiment as well, the breakage of the semiconductor chip CHP1 represented by split, chip, crack, or the like involved in the increase in the clamp force originating from the mounting variation of the component can be suppressed, similar to the second existing technology. That is, the reliability of the flow sensor FS1 can be enhanced in the first embodiment as well.

Therefore, in the first embodiment as well, the resin sealing is assumed to be performed with the elastic body film LAF attached to the upper mold UM, similar to the second existing technology, and hence the upper surface SUR (MR) of the resin MR becomes lower than the upper surface SUR (CHP) of the semiconductor chip CHP1, as shown in FIG. 10 in the flow sensor FS1 of after the resin sealing.

If such configuration is adopted, problems similar to the problems of the second existing technology arise unless some kind of devisal is performed. In other words, as shown in FIG. 7 describing the second existing technology, if the upper surface SUR (MR) of the resin MR is lower than the upper surface SUR (CHP) of the semiconductor chip CHP1, the flow of the gas (air) is greatly disturbed by the influence of the side surface of the semiconductor chip CHP1 projecting out from the resin MR. As a result of the flow direction of the gas (air) greatly changing and the flow becoming unstable at the upstream of the flow sensing unit FDU, the flow sensing accuracy in the flow sensing unit FDU becomes unstable.

Thus, in the first embodiment, a devisal to enhance the flow sensing accuracy in the flow sensing unit FDU is carried out. Specifically, as shown in FIG. 10, the cavity CAV is provided at the upper surface of the resin MR in the flow sensor FS1 according to the first embodiment. In other words, in the flow sensor FS1 according to the first embodiment, the cavity CAV is formed to lie along the side surface of the semiconductor chip CHP1 in the boundary region of the resin MR and the semiconductor chip CHP1. That is, in the first embodiment, the cavity CAV in which the height of the resin MR is locally low exists in the vicinity of the end (boundary region, region around the end) of the semiconductor chip CHP1 at an arbitrary cross-section parallel to the advancing direction of the gas (air) flowing on the exposed flow sensing unit FDU. In other words, in the first embodiment, assuming the upper surface SUR (MR) of the resin MR is lower than the upper surface SUR (CHP) of the semiconductor chip CHP1, the cavity CAV having a lower height than the upper surface SUR (MR) of the resin MR is locally formed at the upper surface SUR (MR) of the resin MR.

Therefore, according to the flow sensor FS1 of the first embodiment, the flow of the gas (air) flowing on the upper side of the flow sensing unit FDU stabilizes without being disturbed. As a result, according to the flow sensor FS1 of the first embodiment, the flow sensing accuracy of the gas (air) in the flow sensing unit FDU can be enhanced, whereby the performance of the flow sensor FS1 can be enhanced.

Hereinafter, a mechanism of enhancing the stability of the flow of the gas (air) flowing on the upper side of the flow sensing unit FDU by providing the cavity CAV on the upper surface of the resin MR will be described with reference to the drawings.

Specifically, as shown in FIG. 10, a case in which the gas (air) is flowing to the upper side of the flow sensing unit FDU in the flow sensor FS1 according to the first embodiment will be considered. In FIG. 10, a state in which the gas (air) is flowing from the left side toward the right side in the plane of drawing is shown.

First, as shown in FIG. 10, the gas (air) flowing from the left side in the plane of drawing passes the upper surface SUR (MR) of the resin MR of the flow sensor FS1. When the gas (air) reaches the boundary region of the resin MR and the end of the semiconductor chip CHP1, the gas (air) collides to the exposed side surface of the semiconductor chip CHP1 from the upper surface SUR (MR) of the resin MR having a low height since the upper surface SUR (MR) of the resin MR is at a position lower than the upper surface SUR (CHP) of the semiconductor chip CHP1. In this case, if the cavity CAV shown in FIG. 10 is not formed in the resin MR, the gas (air) that collided to the side surface of the semiconductor chip CHP1 changes direction by 90 degrees, and flows toward the upper side of the semiconductor chip CHP1. In this case, the flow of the gas (air) flowing on the upper side of the semiconductor chip CHP1 from the left side toward the right side in the plane of drawing is disturbed by some gas (air) that collided to the side surface of the semiconductor chip CHP1 and flowed toward the upper side of the semiconductor chip CHP1. As a result, the stability of the flow of the gas (air) flowing on the flow sensing unit FDU lowers.

If the cavity CAV is formed in the upper surface SUR (MR) of the resin MR as in the first embodiment shown in FIG. 10, an eddying flow circling in the counterclockwise direction is generated in a region defined by the cavity CAV in which the height of the resin MR is locally low and the end of the semiconductor chip CHP1 in the vicinity of the end (boundary region) of the semiconductor chip CHP1. As a result, the gas (air) that collided to the end of the semiconductor chip CHP1 does not change direction by 90 degrees and flow toward the upper side of the semiconductor chip CHP1, but is guided to form the eddying flow. That is, in the first embodiment, the gas (air) that collided to the exposed side surface of the semiconductor chip CHP1 forms the eddying flow by forming the cavity CAV. This means that the gas (air) that collided to the exposed side surface of the semiconductor chip CHP1 is suppressed from changing direction by 90 degrees and flowing toward the upper side of the semiconductor chip CHP1. As a result, according to the first embodiment, the stability of the flow of the gas (air) flowing on the flow sensing unit FDU can be enhanced, whereby the flow sensing accuracy of the flow sensor FS1 can be enhanced.

That is, the characteristic of the first embodiment lies in providing the cavity CAV in the upper surface SUR (MR) of the resin MR, where the advancing direction of the gas (air) that collided to the exposed side surface of the semiconductor chip CHP1 can be deviated from the direction toward the upper side of the semiconductor chip CHP1 by providing the cavity CAV. In other words, the eddying flow in the counterclockwise direction is generated by providing the local cavity CAV in the upper surface SUR (MR) of the resin MR, whereby the advancing direction of the gas (air) that collided to the exposed side surface of the semiconductor chip CHP1 can be changed in the eddying direction instead of the direction toward the upper side of the semiconductor chip CHP1 differing by 90 degrees.

Therefore, according to the flow sensor FS1 of the first embodiment, the flow of the gas (air) at the upper side of the flow sensing unit FDU is stably made smooth without being disturbed, and the flow sensing accuracy in the flow sensing unit FDU can be enhanced.

Figure 11:
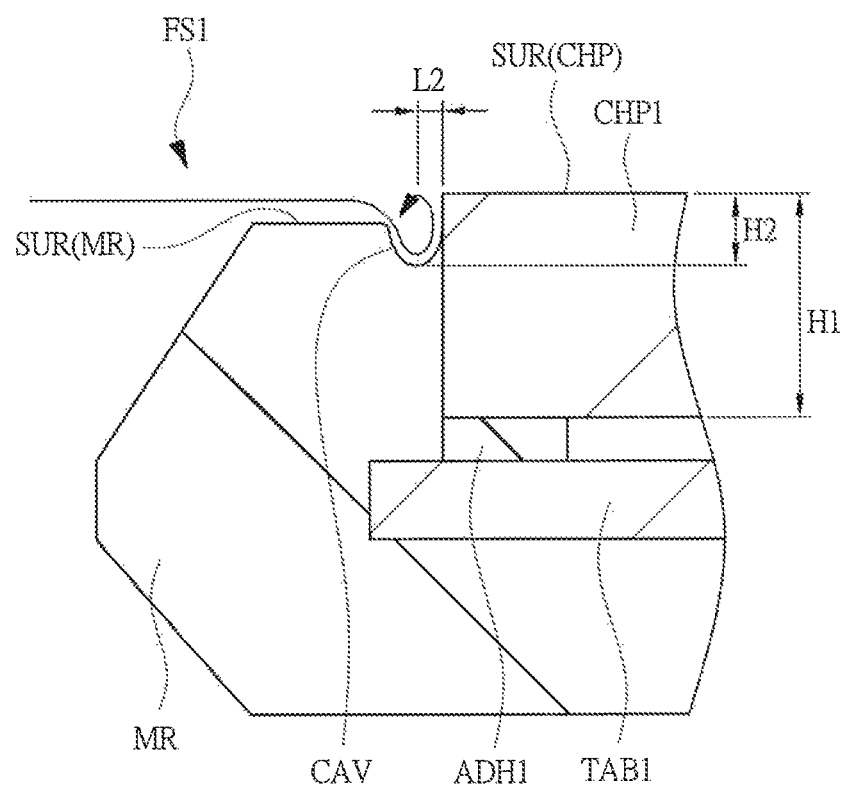
FIG. 11 is an enlarged view of a partial region of FIG. 10.

FIG. 11 is an enlarged view showing a region RA of FIG. 10. In FIG. 11, if a dimension H2 of the upper surface SUR (CHP) of the semiconductor chip CHP1 to the lowest portion of the cavity CAV formed in the upper surface SUR (MR) of the resin MR is too large, the resin flowability at the lower part of the cavity CAV degrades, and an unfilled failure of the resin MR may occur at the relevant portion. Thus, the dimension H2 is desirably smaller than or equal to half the thickness H1 of the semiconductor chip CHP1 from the standpoint of preventing the unfilled failure.

To generate the eddying current in the counterclockwise direction at the portion defined by the cavity CAV formed in the upper surface SUR (MR) of the resin MR and the side surface of the semiconductor chip CHP1, the lowest portion of the cavity CAV is desirably installed at the position as close as possible to the end of the semiconductor chip CHP1. In particular, a distance L2 from the lowest portion of the cavity CAV to the end of the semiconductor chip CHP1 is desirably smaller than or equal to ¼ of the width dimension L1 of the semiconductor chip CHP1 shown in FIG. 10 from the standpoint of efficiently generating the eddying flow in the counterclockwise direction. Furthermore, the cavity CAV is desirably formed to make contact with the end of the semiconductor chip CHP1.

In the first embodiment, for example, an example in which the cavity CAV is formed over three sides (sides SD1, SD2, SD3) of the semiconductor chip CHP1 has been described, as shown in FIG. 9A. However, the purpose of forming the cavity CAV in the upper surface SUR (MR) of the resin MR is to deviate the advancing direction of the gas (air) collided to the exposed side surface of the semiconductor chip CHP1 from the direction toward the upper side of the semiconductor chip CHP1 by generating the eddying flow in the counterclockwise direction, as shown in FIG. 10. Thus, the cavity CAV merely needs to be provided at least on the upper surface SUR (MR) of the resin MR in the vicinity of the boundary region of the end of the semiconductor chip CHP1 and the resin MR at the upstream side where the gas (air) flows, and for example, the cavity CAV does not need to be provided in the upper surface SUR (MR) of the resin MR existing in the vicinity of the boundary region on the downstream side where the gas (air) flows and other regions. Specifically, in FIG. 9A, the cavity CAV needs to be provided along the side SD1 of the semiconductor chip CHP1 but the cavity CAV does not need to be provided along other sides SD2 and SD3. That is, if the cavity CAV is formed along the side SD1 of the semiconductor chip CHP1, the advancing direction of the gas (air) that collided to the exposed side surface of the semiconductor chip CHP1 can be deviated from the direction toward the upper side of the semiconductor chip CHP1. Thus, the flow of the gas (air) at the upper side of the flow sensing unit FDU can be stably made smooth without being disturbed, so that the flow sensing accuracy in the flow sensing unit FDU can be enhanced.

Figure 12:
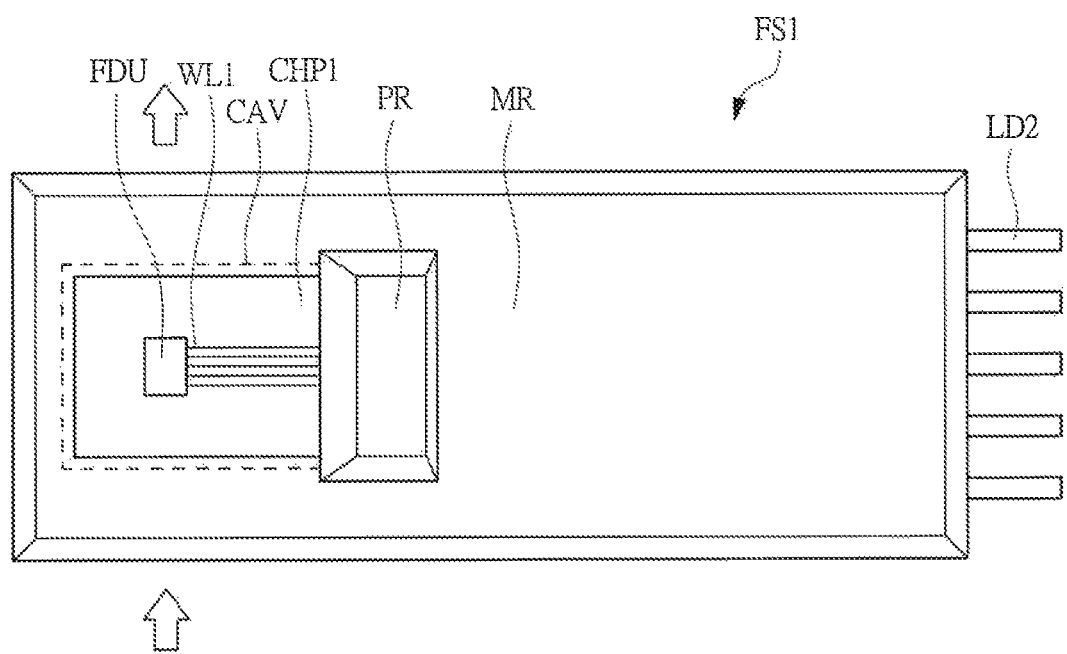
FIG. 12 is a plan view showing a mounting configuration of the flow sensor after a dam bar is removed.

Therefore, although the flow sensor FS1 according to the first embodiment is mounting configured, the dam bar DM configuring the outer frame body of the lead frame LF is removed after sealing with the resin MR in the actual flow sensor FS1. FIG. 12 is a plan view showing a mounting configuration of the flow sensor FS1 of after the dam bar DM is removed. As shown in FIG. 12, a plurality of electrical signals can be independently retrieved from the plurality of leads LD2 by cutting the dam bar DM.

<Method for Manufacturing Flow Sensor According to First Embodiment>

The configuration of the flow sensor FS1 according to the first embodiment has been described above, and now, the method for manufacturing the same will be hereinafter described with reference to the drawings. FIG. 13 to FIG. 16 show manufacturing steps at the cross-section cut along line B-B of FIG. 9A.

Figure 13:
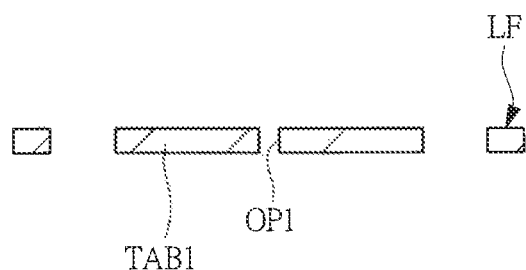
FIG. 13 is a cross-sectional view showing manufacturing step of the flow sensor according to the first embodiment.

First, as shown in FIG. 13, the lead frame LF made of copper material is prepared, for example. The lead frame LF is formed with the chip mounting section TAB1, and the opening OP1 is formed at the bottom of the chip mounting section TAB1.

Figure 14:
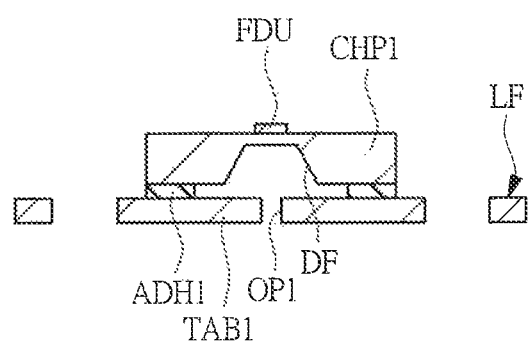
FIG. 14 is a cross-sectional view showing the manufacturing step of the flow sensor following FIG. 13.

Then, as shown in FIG. 14, the semiconductor chip CHP1 is mounted on the chip mounting section TAB1. Specifically, the semiconductor chip CHP1 is connected to the chip mounting section TAB1 formed on the lead frame LF with the adhesive material ADH1. In this case, the semiconductor chip CHP1 is mounted on the chip mounting section TAB1 so that the diaphragm DF formed on the semiconductor chip CHP1 communicates to the opening OP formed at the bottom of the chip mounting section TAB1. The flow sensing unit FDU, the wiring (not shown), and the pad (not shown) are formed on the semiconductor chip CHP1 through the normal semiconductor manufacturing process. For example, the diaphragm DF is formed at a position on the rear surface opposing the flow sensing unit FDU formed on the front surface of the semiconductor chip CHP1 through anisotropic etching.

Thereafter, although not shown, the pad formed on the semiconductor chip CHP1 and the lead formed on the lead frame LF are connected with a wire (wire bonding). This wire is made from a gold wire, for example.

Figure 15:
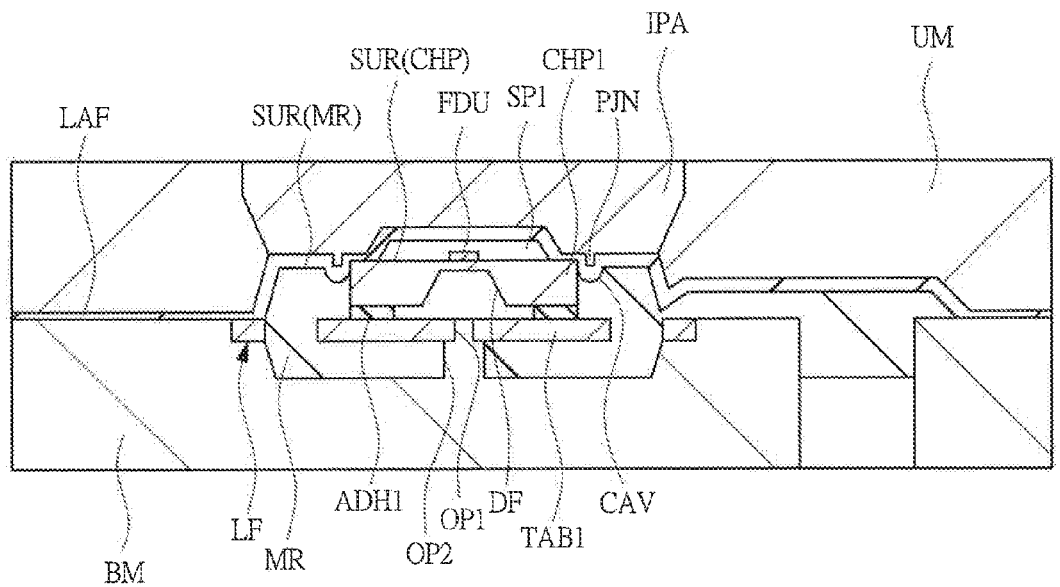
FIG. 15 is a cross-sectional view showing the manufacturing step of the flow sensor following FIG. 14.

Next, as shown in FIG. 15, the side surface of the semiconductor chip CHP1 is sealed with the resin MR (mold step). That is, a part of the semiconductor chip CHP1 is sealed with the resin MR (sealing body) while exposing the flow sensing unit FDU formed on the semiconductor chip CHP1.

Specifically, the upper mold UM attached with the elastic body film LAF and the bottom mold BM are first prepared, the upper mold being larger than the semiconductor chip CHP1 in plan view and being inserted with the insert piece IPA having a projecting portion PJN in a region not overlapping with the semiconductor chip CHP1 in plan view.

The lead frame LF mounted with the semiconductor chip CHP1 is sandwiched by way of the second space by the upper mold UM and the bottom mold BM with a part of the insert piece IPA securely attached to the upper surface of the semiconductor chip CHP1 by way of the elastic body film LAF and while forming the first space SP1 surrounding the flow sensing unit FDU between the insert piece IPA and the semiconductor chip CHP1.

Figure 16:
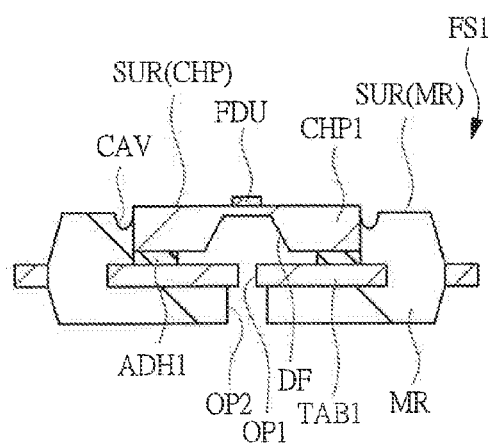
FIG. 16 is a cross-sectional view showing the manufacturing step of the flow sensor following FIG. 15.

Thereafter, the resin MR is flowed into the second space under heating. In this case, the cavity CAV is formed in the region corresponding to the projecting portion PJN in the upper surface of the resin MR. As shown in FIG. 16, at the stage the resin MR hardened, the lead frame LF mounted with the semiconductor chip CHP1 is detached from the upper mold UM and the bottom mold BM. The flow sensor FS1 according to the first embodiment is thereby manufactured.

In the resin sealing step (mold step) according to the first embodiment, the upper mold UM and the bottom mold BM having a high temperature of higher than or equal to 80° C. are used, and hence the heat is transmitted to the resin MR injected to the second space in a short time from the heated upper mold UM and the bottom mold BM. As a result, according to the method for manufacturing the flow sensor FS1 of the first embodiment, the heating/hardening time of the resin MR can be reduced.

For example, as described in the section of problems to be solved by the invention, when carrying out only the fixing of the gold wire (wire) by the potting resin, the time until the potting resin hardens becomes long since hardening by heating is not promoted and the throughput in the manufacturing step of the flow sensor lowers.

On the other hand, in the resin sealing step of the first embodiment, the heated upper mold UM and the bottom mold BM are used, as described above, and thus the heat can be transmitted from the heated upper mold UM and the bottom mold BM to the resin MR in a short time, and the heating/hardening time of the resin MR can be reduced. As a result, according to the first embodiment, the throughput in the manufacturing step of the flow sensor FS1 can be enhanced.

<Representative Effect According to First Embodiment>

The flow sensor FS1 according to the first embodiment has the following effects.

(1) According to the first embodiment, for example, the cavity CAV is provided in the upper surface SUR (MR) of the resin MR, as shown in FIG. 10. The advancing direction of the gas (air) that collided to the exposed side surface of the semiconductor chip CHP1 can be deviated from the direction toward the upper side of the semiconductor chip CHP1 by providing the cavity CAV. In other words, the eddying flow in the counterclockwise direction is generated by providing the local cavity CAV in the upper surface SUR (MR) of the resin MR, whereby the advancing direction of the gas (air) that collided to the exposed side surface of the semiconductor chip CHP1 can be changed to the eddying direction instead of to the direction toward the upper side of the semiconductor chip CHP1 differing by 90 degrees. Thus, according to the flow sensor FS1 of the first embodiment, the flow of the gas (air) at the upper side of the flow sensing unit FDU can be stably made smooth without being disturbed, and the flow sensing accuracy in the flow sensing unit FDU can be enhanced.

(2) According to the first embodiment, for example, as shown in FIG. 15, the sealing by the resin MR is carried out with the semiconductor chip CHP1 formed with the flow sensing unit FDU fixed with the mold, and thus a part of the semiconductor chip CHP1 can be sealed with the resin MR while suppressing the position shift of the semiconductor chip CHP1. According to the flow sensor FS1 in the first embodiment, this means that apart of the semiconductor chip CHP1 can be sealed with the resin MR while suppressing the position shift of each flow sensor FS1 and means that the variation in the position of the flow sensing unit FDU formed in the semiconductor chip CHP1 can be suppressed. As a result, according to the first embodiment, the position of the flow sensing unit FDU for sensing the flow of the gas can be coincided in each flow sensor FS1, so that the effect of being able to suppress the performance variation in sensing the gas flow is obtained in each flow sensor FS1.

(3) According to the first embodiment, for example, the semiconductor chip CHP1 is held down with the upper mold UM by way of the elastic body film LAF, as shown in FIG. 15. Thus, the mounting variation of the component originating from the thickness variation of the semiconductor chip CHP1, the adhesive material ADH1, and the lead frame LF can be absorbed by the change in the thickness of the elastic body film LAF. Thus, according to the first embodiment, the clamp force applied on the semiconductor chip CHP1 can be alleviated. As a result, the breakage represented by split, chip, crack, or the like of the semiconductor chip CHP1 can be prevented.

(4) According to the first embodiment, for example, as shown in FIG. 10, the upper surface SUR (CHP) of the semiconductor chip CHP1 is not covered with the resin MR in the one cross-section direction parallel to the advancing direction of the gas (air) flowing on the exposed flow sensing unit FDU. Thus, according to the first embodiment, for example, even if the miniaturization of the size of the semiconductor chip CHP1 formed with the flow sensing unit FDU is forwarded, the flow sensing unit FDU can be prevented from being covered with the resin MR.

First Modification Example

Now, a first modification example of the flow sensor FS1 according to the first embodiment will be described. In the first embodiment, for example, an example in which the upper surface SUR (MR) of the resin MR brought into contact with the cavity CAV is formed to be substantially parallel to the horizontal direction has been described, as shown in FIG. 10. In the first modification example, an example in which the upper surface SUR (MR) of the resin MR brought into contact with the cavity CAV is inclined will be described.

Figure 17:
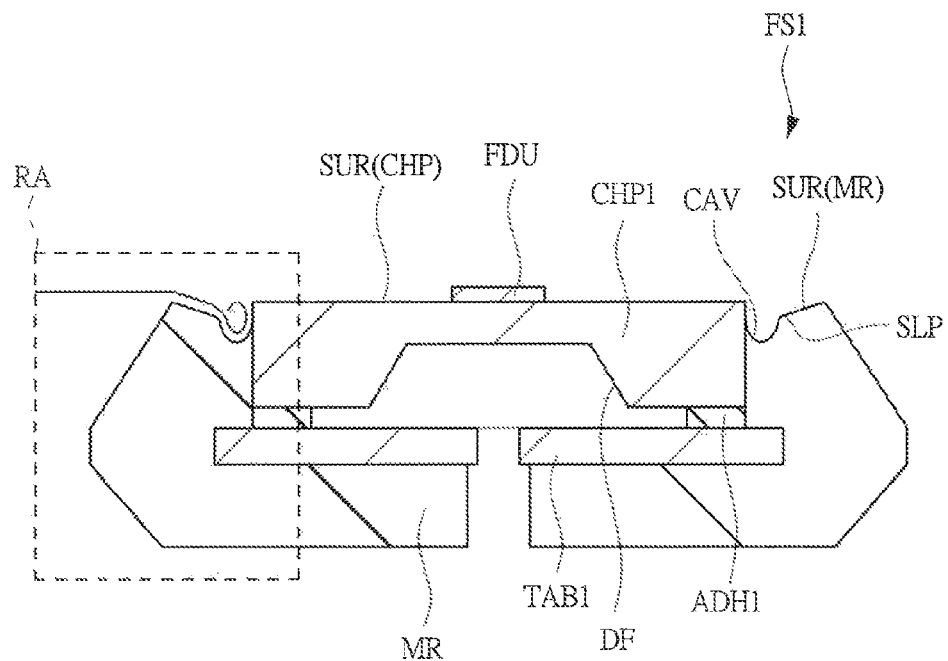
FIG. 17 is a cross-sectional view showing a configuration of a flow sensor according to a first modification example.

FIG. 17 is a cross-sectional view showing a configuration of the flow sensor FS1 according to the first modification example. As shown in FIG. 17, the cavity CAV is provided on the upper surface SUR (MR) of the resin MR in the first modification example. The advancing direction of the gas (air) that collided to the exposed side surface of the semiconductor chip CHP1 can be deviated from the direction toward the upper side of the semiconductor chip CHP1 by providing the cavity CAV. In other words, the eddying flow in the counterclockwise direction is generated by providing the local cavity CAV in the upper surface SUR (MR) of the resin MR, whereby the advancing direction of the gas (air) that collided to the exposed side surface of the semiconductor chip CHP1 can be changed to the eddying direction.

Furthermore, the flow sensor FS1 according to the first modification example has a characteristic in that the upper surface SUR (MR) of the resin MR includes a slant portion SLP so as to become lower toward the end of the semiconductor chip CHP1 assuming the upper surface SUR (MR) of the resin MR is lower than the upper surface SUR (CHP) of the semiconductor chip CHP1. Thus, the eddying flow in the counterclockwise direction is easily generated in the flow of the gas (air) guided from the inclined upper surface SUR (MR) of the resin MR to the cavity CAV and reaching the side surface of the semiconductor chip CHP1. As a result, according to the flow sensor FS1 of the first modification example, the flow of the gas (air) at the upper side of the flow sensing unit FDU can be stably made smooth without being disturbed, so that the flow sensing accuracy in the flow sensing unit FDU can be enhanced.

Figure 18:
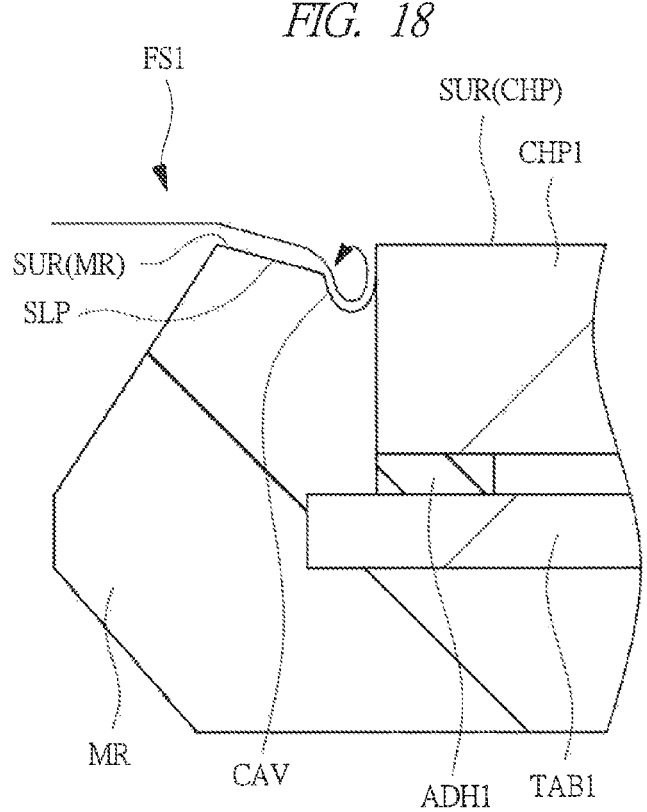
FIG. 18 is an enlarged view showing a partial region of FIG. 17.

FIG. 18 is an enlarged view showing a region RA of FIG. 17. As shown in FIG. 18, in the flow sensor FS1 according to the first modification example, the cavity CAV is formed on the upper surface SUR (MR) of the resin MR making contact with the side surface of the semiconductor chip CHP1, and the slant portion SLP is formed on the upper surface SUR (MR) of the resin MR connecting to the cavity CAV. Specifically, the upper surface SUR (MR) of the resin MR is formed with the slant portion SLP that becomes lower toward the end of the semiconductor chip CHP1. In this case, the gas (air) first flows along the slant portion SLP formed on the upper surface SUR (MR) of the resin MR, as shown in FIG. 18. The gas (air) flowing along the slant portion SLP passes a region defined by the cavity CAV and the side surface of the semiconductor chip CHP1, whereby the eddying flow in the counterclockwise direction is generated. In this case, the gas (air) flows along the upper surface SUR (MR) of the resin MR including the slant portion SLP in advance before passing the region defined by the cavity CAV and the side surface of the semiconductor chip CHP1, whereby the eddying flow in the counterclockwise direction is easily generated.

According to the above mechanism, the advancing direction of the gas (air) that collided to the exposed side surface of the semiconductor chip CHP1 can be changed to the eddying direction according to the flow sensor FS1 of the first modification example. Thus, in the first modification example as well, the flow of the gas (air) at the upper side of the flow sensing unit FDU thus can be stably made smooth without being disturbed, and hence the flow sensing accuracy in the flow sensing unit FDU can be enhanced.

The method for manufacturing the flow sensor FS1 according to the first modification example configured as above is substantially similar to the method for manufacturing the flow sensor FS1 according to the first embodiment. In the first modification example, however, the slant portion SLP needs to be formed on the upper surface SUR (MR) of the resin MR, and thus the shape of the insert piece to be inserted to the upper mold UM differs from the first embodiment in the resin sealing step. The resin sealing step in the first modification example will be described below.

Figure 19:
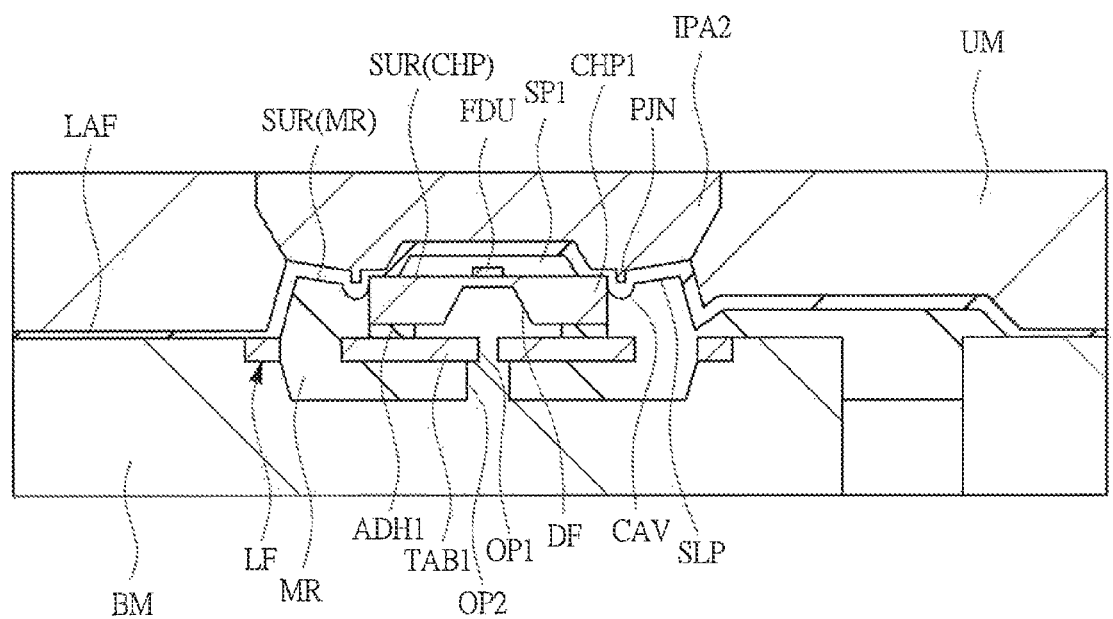
FIG. 19 is a diagram describing a resin sealing step in the first modification example.

FIG. 19 is a diagram describing the resin sealing step in the first modification example. As shown in FIG. 19, in the first modification example, an insert piece IPA2 is inserted to the upper mold UM. The insert piece IPA2 includes the projecting portion PJN in a region that is greater than the semiconductor chip CHP1 in plan view and that does not overlap the semiconductor chip CHP1 in plan view. In such insert piece IPA2, the outer side of the projecting portion PJN is inclined. Through the use of the insert piece IPA2 having such shape, the cavity CAV is formed on the upper surface SUR (MR) of the resin MR brought into contact with the side surface of the semiconductor chip CHP1 and the upper surface SUR (MR) of the resin MR of the semiconductor chip CHP1 may include the slant portion SLP that becomes lower toward the end of the semiconductor chip CHP1 in the first modification example.

Second Modification Example

A second modification example of the flow sensor FS1 according to the first embodiment will now be described. In the first embodiment, for example, an example in which the semiconductor chip CHP1 is arranged on the chip mounting section TAB1 by way of the adhesive material ADH1 has been described, as shown in FIG. 9B and FIG. 9C. In the second modification example, an example of inserting a plate-shaped structure PLT between the semiconductor chip CHP1 and the chip mounting section TAB1 (lead frame LF) will be described.

Figure 20:
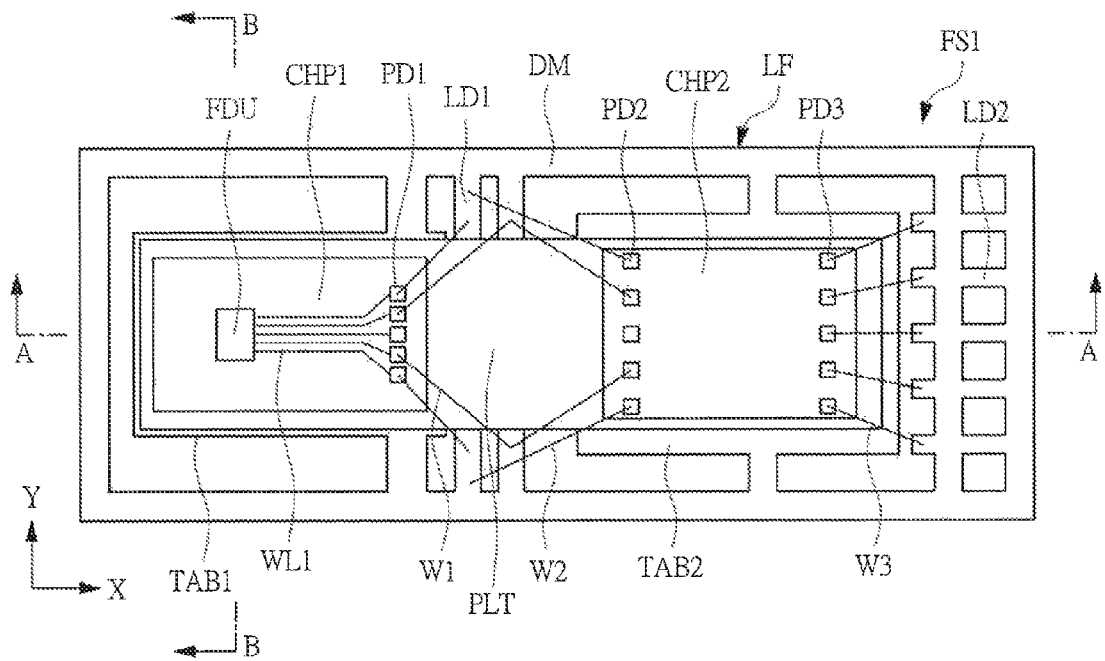
FIG. 20 is a plan view showing a structure of a flow sensor before resin sealing according to a second modification example.
Figure 21:
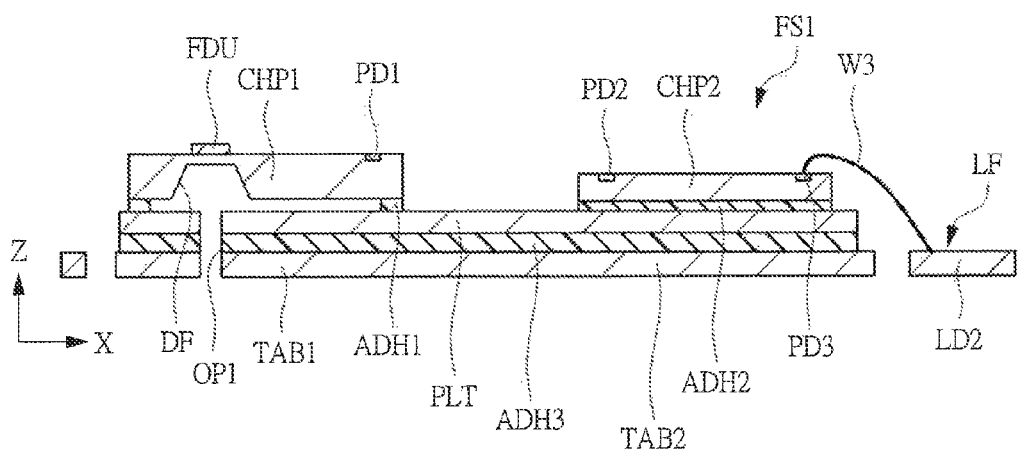
FIG. 21 is a cross-sectional view taken along the line A-A of FIG. 20.

FIG. 20 is a plan view showing a structure of the flow sensor FS1 before the resin sealing in the second modification example. FIG. 21 is a cross-sectional view taken along line A-A of FIG. 20, and FIG. 22 is a cross-sectional view taken along line B-B of FIG. 20.

As shown in FIG. 20, the flow sensor FS1 according to the second modification example has the plate-shaped structure PLT formed over the lower surface of the semiconductor chip CHP1 and the lower surface of the semiconductor chip CHP2. The plate-shaped structure PLT has a rectangular shape, for example, and is found to have an outer shape dimension that encloses the semiconductor chip CHP1 and the semiconductor chip CHP2 in plan view.

Figure 22:
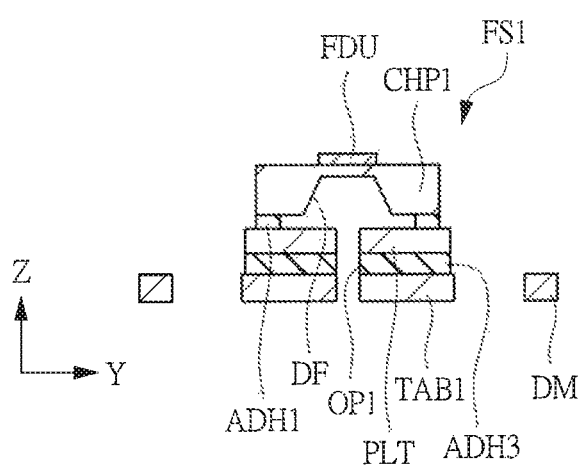
FIG. 22 is a cross-sectional view taken along the line B-B of FIG. 20.

Specifically, as shown in FIG. 21 and FIG. 22, the plate-shaped structure PLT is arranged on the lead frame LF including the chip mounting section TAB1 and the chip mounting section TAB2. The plate-shaped structure PLT is, for example, adhered to the lead frame LF using an adhesive material ADH3, but may be joined using a paste material. On the plate-shaped structure PLT, the semiconductor chip CHP1 is mounted by way of the adhesive material ADH1 and the semiconductor chip CHP2 is mounted by way of the adhesive material ADH2. In this case, if the plate-shaped structure PLT made from a metal material, the connection can be made with the semiconductor chip CHP1 and the wire W1, and the connection can be made with the semiconductor chip CHP2 and the wire W2. Components such as a capacitor, thermistor, and the like other than the plate-shaped structure PLT may be mounted on the lead frame LF.

The plate-shaped structure PLT described above mainly functions to enhance the rigidity of the flow sensor FS1 and as a buffer with respect to an external impact. Furthermore, if the plate-shaped structure PLT is made from a conductive material, the plate-shaped structure PLT can be electrically connected with the semiconductor chip CHP1 (pad PD1) and the semiconductor chip CHP2 (pad PD2), used for the supply of a ground potential (reference potential) and also stabilize the ground potential.

The plate-shaped structure PLT may be configured, for example, from a thermoplastic resin such as PBT resin, ABS resin, PC resin, nylon resin, PS resin, PP resin, fluorine resin, and the like, or a thermosetting resin such as epoxy resin, phenol resin, urethane resin, and the like. In this case, the plate-shaped structure PLT can mainly function as a buffer for protecting the semiconductor chip CHP1 and the semiconductor chip CHP2 from the external impact.

The plate-shaped structure PLT may be formed by press working a metal material such as iron alloy, aluminum alloy, copper alloy, or the like or may be formed from a glass material. In particular, if the plate-shaped structure PLT is formed from the metal material, the rigidity of the flow sensor FS1 can be enhanced. Furthermore, the plate-shaped structure PLT may be electrically connected to the semiconductor chip CHP1 and the semiconductor chip CHP2, and the plate-shaped structure PKT may be used for the supply of the ground potential and the stabilization of the ground potential.

In the flow sensor FS1 of the second modification example configured as above as well, for example, the resin sealing structure similar to the flow sensor FS1 of the first embodiment shown in FIG. 9A to FIG. 9C can be realized. That is, in the flow sensor FS1 of the second modification example as well, the cavity can be provided on the upper surface of the resin. As a result, in the second modification example as well, the eddying flow in the counterclockwise direction is generated by providing a local cavity on the upper surface of the resin, whereby the advancing direction of the gas (air) that collided to the exposed side surface of the semiconductor chip can be changed to the eddying direction instead of the direction toward the upper side of the semiconductor chip differing by 90 degrees. Thus, even in the flow sensor FS1 of the second modification example, the flow of the gas (air) at the upper side of the flow sensing unit can be stably made smooth without being disturbed, so that the flow sensing accuracy in the flow sensing unit can be enhanced.

Second Embodiment

In the first embodiment, for example, the flow sensor FS1 of a two-chip structure including the semiconductor chip CHP1 and the semiconductor chip CHP2 has been described by way of example, as shown in FIG. 9B. The technical scope of the present invention is not limited thereto, and for example, may also be applied to a flow sensor of a one-chip structure including one semiconductor chip in which the flow sensing unit and the control unit (control circuit) are integrally formed. In the second embodiment, a case of applying the technical scope of the present invention to the flow sensor of one chip structure will be described.

<Mounting Direction of Flow Sensor According to Second Embodiment>

FIG. 23 is a diagram showing a mounting configuration of a flow sensor FS2 according to the second embodiment, and is a diagram showing a configuration of after being sealed with the resin. In particular, FIG. 23A is a plan view showing a mounting configuration of the flow sensor FS2 according to the second embodiment. FIG. 23B is a cross-sectional view cut along line A-A of FIG. 23A, and FIG. 23C is a cross-sectional view taken along line B-B of FIG. 23A. In particular, FIG. 23B shows one cross-section parallel to the advancing direction of the gas flowing on the exposed flow sensing unit FDU, where the gas is assumed to flow from the left side toward the right side on the X axis, for example, in FIG. 23B.

First, as shown in FIG. 23A, the flow sensor FS2 according to the second embodiment includes a sealing body including the rectangular-shaped resin MR, and the lead LD2 is projected out from the resin MR. A part of the semiconductor chip CHP1 is exposed from the upper surface (front surface) of the resin MR. In particular, the flow sensing unit FDU and the control unit that controls the flow sensing unit FDU are formed on the semiconductor chip CHP1. Specifically, the flow sensing unit FDU formed on the semiconductor chip CHP1 is electrically connected with the control unit by the wiring WL1. In FIG. 23A, the control unit is covered by the resin MR and thus is not shown, but is arranged inside the projection PR formed on the resin MR. That is, the flow sensor FS2 according to the second embodiment includes the semiconductor chip CHP1 in which the flow sensing unit FDU and the control unit are integrally formed, thus having a configuration in which the flow sensing unit FDU is exposed from the resin MR. The cavity CAV is formed in the resin MR along the three sides of the semiconductor chip CHP1 surrounded with the resin MR.

As shown in FIG. 23B, the flow sensor FS2 according to the second embodiment has the semiconductor chip CHP1 mounted on the chip mounting section TAB1 by way of the adhesive material ADH1. In this case, the flow sensing unit FDU is formed on the upper surface (front surface, main surface) of the semiconductor chip CHP1, and the diaphragm DF (thin plate section) is formed on the rear surface of the semiconductor chip CHP1 opposing the flow sensing unit FDU. The opening OP1 is formed at the bottom of the chip mounting section TAB1 existing on the lower side of the diaphragm DF.

The adhesive material ADH1 adhering the semiconductor chip CHP1 and the chip mounting section TAB1 can use, for example, a thermosetting resin such as epoxy resin, polyurethane resin, and the like, and a thermoplastic resin such as polyimide resin, acryl resin, and the like.

As shown in FIG. 23B, in the flow sensor FS2 according to the second embodiment, the resin MR is formed to cover a part of the side surface of the semiconductor chip CHP1 and a part of the chip mounting section TAB1.

In this case, in the second embodiment, the opening OP1 is formed at the bottom of the chip mounting section TAB1 on the lower side of the diaphragm DF formed on the rear surface of the semiconductor chip CHP1, and furthermore, the opening OP2 is formed in the resin MR covering the rear surface of the chip mounting section TAB1.

Thus, according to the flow sensor FS2 of the second embodiment, the internal space of the diaphragm DF is communicated with the external space of the flow sensor FS2 through the opening OP1 formed in the bottom of the chip mounting section TAB1 and the opening OP2 formed in the resin MR. As a result, the pressure of the internal space of the diaphragm DF and the pressure of the external space of the flow sensor FS2 are made equal, so that the stress can be suppressed from being applied on the diaphragm DF.

Furthermore, in the second embodiment as well, the upper surface SUR (MR) of the resin MR is formed to be lower than the upper surface SUR (CHP) of the semiconductor chip CHP1, and the cavity CAV is provided in the upper surface SUR (MR) of the resin MR, as shown in FIG. 23B. Therefore, in the second embodiment as well, the advancing direction of the gas (air) that collided to the exposed side surface of the semiconductor chip CHP1 can be deviated from the direction toward the upper side of the semiconductor chip CHP1 by providing the cavity CAV in the upper surface SUR (MR) of the resin MR. In other words, the eddying flow in the counterclockwise direction is generated by providing the local cavity CAV in the upper surface SUR (MR) of the resin MR, whereby the advancing direction of the gas (air) that collided to the exposed side surface of the semiconductor chip CHP1 can be changed in the eddying direction instead of the direction toward the upper side of the semiconductor chip CHP1 differing by 90 degrees.

In particular, in the second embodiment, the cavity CAV is formed in the upper surface SUR (MR) of the resin MR that makes contact with the side surface of the semiconductor chip CHP1, and the slant portion SLP is formed on the upper surface SUR (MR) of the resin MR connecting to the cavity CAV, similar to the first modification example. Specifically, the upper surface SUR (MR) of the resin MR is formed with the slant portion SLP that lowers toward the end of the semiconductor chip CHP1. Therefore, in the second embodiment as well, the gas (air) flows along the upper surface SUR (MR) of the resin MR including the slant portion SLP in advance, so that an effect in that the eddying flow in the counterclockwise direction can be easily generated is obtained.

Therefore, in the flow sensor FS2 according to the second embodiment as well, the flow of the gas (air) at the upper side of the flow sensing unit FDU can be stably made smooth without being disturbed, and hence the flow sensing accuracy in the flow sensing unit FDU can be enhanced.

As shown in FIG. 23C, the semiconductor chip CHP1 is mounted on the chip mounting section TAB by way of the adhesive material ADH1, but it can be seen that the flow sensing unit FDU and the control unit CU are formed on the upper surface of the semiconductor chip CHP1. That is, in the second embodiment, it can be seen that the flow sensing unit FDU and the control unit CU are integrally formed on the semiconductor chip CHP1. Furthermore, the pad PD is formed on the upper surface of the semiconductor chip CHP1, and the pad PD and the lead LD2 are electrically connected with the wire W. The control unit CU and the pad PD formed on the upper surface of the semiconductor chip CHP1, and the wire W are sealed with the resin MR. In particular, the projection PR made of the resin MR is formed in the region of sealing the control unit CU and the wire W to surely seal the wire W with the resin MR.

In the foregoing, the invention made by the inventors of the present invention has been concretely described based on the embodiments. However, it is needless to say that the present invention is not limited to the foregoing embodiments and various modifications and alterations can be made within the scope of the present invention.

The flow sensor described in the embodiments described above is a device that measures the flow of the gas, but a specific type of gas is not limited, and application can be widely made to a device for measuring the flow of an arbitrary gas such as air, LP gas, carbon dioxide ($CO_2$ gas), chlorofluorocarbon gas, and the like.

In the embodiments described above, the flow sensor for measuring the flow of the gas has been described, but the technical scope of the present invention is not limited thereto, and application can be widely made to a semiconductor device that resin seals a part of the semiconductor element such as a humidity sensor, and the like in the exposed state.

INDUSTRIAL APPLICABILITY

The present invention can be widely used, for example, in a manufacturing field for manufacturing a semiconductor device such as a flow sensor.

EXPLANATION OF REFERENCE NUMERALS

1 CPU
2 Input circuit
3 Output circuit
4 Memory
ADH1 Adhesive material
ADH2 Adhesive material
ADH3 Adhesive material
BM Bottom mold
BR1 Downstream resistance thermometer
BR2 Downstream resistance thermometer
CAV Cavity
CHP1 Semiconductor chip
CHP2 Semiconductor chip
DF Diaphragm
DM Dam bar
FDU Flow sensing unit
FS1 Flow sensor
FS2 Flow sensor
FSP1 Flow sensor
FSP2 Flow sensor
HCB Heater control bridge
HR Heating resistor
IPA Insert piece
IPA2 Insert piece
LAF Elastic body film
LD1 Lead
LD2 Lead
LF Lead frame
MR Resin
OP1 Opening
OP2 Opening
PD Pad
PD1 Pad
PD2 Pad
PD3 Pad
PJN Projecting portion
PLT Plate shaped structure
PR Projection
PS Power supply
Q Gas flow
R1 Resistor
R2 Resistor
R3 Resistor
R4 Resistor
RA Region
SD1 Side
SD2 Side
SD3 Side
SLP Inclined section
SP1 First space
SUR (CHP) Upper surface
SUR (MR) Upper surface
TAB1 Chip mounting section
TAB2 Chip mounting section
Tr Transistor
TSB Temperature sensor bridge
UM Upper mold
UR1 Upstream resistance thermometer
UR2 Upstream resistance thermometer
Vref1 Reference voltage
Vref2 Reference voltage
W Wire
W1 Wire
W2 Wire
W3 Wire
WL1 Wiring

What is claimed is:

1. A flow sensor comprising:
   a semiconductor chip; and
   a resin exposing an upper surface of the semiconductor chip and covering a part of the semiconductor chip, wherein
   a cavity is formed on an upper surface of the resin, and
   a cross-section of the flow sensor includes a predetermined cross-section in which an upper surface of the resin closer to the semiconductor chip than a lower end of the cavity is lower than an upper surface of the semiconductor chip.

2. The flow sensor according to claim 1, wherein the cavity is in a region around the semiconductor chip.

3. The flow sensor according to claim 1, wherein the cavity is formed along a side surface of the semiconductor chip.

4. The flow sensor according to claim 1, wherein a distance on the predetermined cross-section from a lowest portion of the cavity to the upper surface of the semiconductor chip is smaller than or equal to a half of a thickness of the semiconductor chip at an end of the upper surface of the semiconductor chip.

5. The flow sensor according to claim 1, wherein a distance on the predetermined cross-section from a lowest portion of the cavity to the end of the upper surface of the semiconductor chip is smaller than or equal to a quarter of a width of the upper surface of the semiconductor chip in the predetermined cross-section.

6. The flow sensor according to claim 1, wherein the upper surface of the resin is inclined to become lower toward the end of the semiconductor chip.

7. The flow sensor according to claim 1, further comprising a control chip that controls the semiconductor chip.

8. The flow sensor according to claim 7, wherein the control chip is covered by the resin.

9. The flow sensor according to claim 1, wherein
   the semiconductor chip is formed with a plurality of first pads, the flow sensor further includes a chip mounting section mounted with the semiconductor chip, and on which a plurality of leads are arranged, and a plurality of first wires connecting the plurality of leads to the plurality of first pads respectively, and
   the plurality of first wires are covered by the resin.

10. The flow sensor according to claim 7, wherein
    the semiconductor chip is formed with a plurality of first pads, and the control chip is formed with a plurality of second pads, the flow sensor further includes a chip mounting section mounted with the semiconductor chip and the control chip, and on which a plurality of leads are arranged, a plurality of first wires connecting the plurality of leads to the plurality of first pads respectively, and a plurality of second wires connecting the plurality of leads to the plurality of second pads respectively, and the plurality of first wires and the plurality of second wires are covered by the resin.

* * * * *